US007910003B2

(12) United States Patent
Ferrer et al.

(10) Patent No.: US 7,910,003 B2
(45) Date of Patent: Mar. 22, 2011

(54) POLYSULFONE AND POLY(N-VINYL LACTAM) POLYMER ALLOY AND FIBER AND FILTER MATERIALS MADE OF THE ALLOY

(75) Inventors: Ismael Ferrer, Minneapolis, MN (US); Richard S. Cardinal, Minneapolis, MN (US); Veli Kalayci, Farmington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 12/573,241

(22) Filed: Oct. 5, 2009

(65) Prior Publication Data
US 2010/0018934 A1 Jan. 28, 2010

Related U.S. Application Data

(62) Division of application No. 11/272,429, filed on Nov. 10, 2005, now Pat. No. 7,641,055.

(51) Int. Cl.
*B01D 46/54* (2006.01)
*B01D 71/68* (2006.01)
*B01D 71/28* (2006.01)
*B01D 61/00* (2006.01)

(52) U.S. Cl. ............... 210/650; 210/649; 210/500.41; 95/273

(58) Field of Classification Search .................. None
See application file for complete search history.

(56) References Cited

U.S. PATENT DOCUMENTS

| | | |
|---|---|---|
| 3,655,822 A | 4/1972 | McGrath et al. |
| 3,895,091 A | 7/1975 | Short et al. |
| 3,898,204 A | 8/1975 | Short et al. |
| 3,912,695 A | 10/1975 | Short et al. |
| 4,650,506 A | 3/1987 | Barris et al. |
| 4,684,699 A | 8/1987 | Robeson |
| 4,720,292 A | 1/1988 | Engel et al. |
| 4,772,391 A | 9/1988 | Baker et al. |
| 4,822,382 A | 4/1989 | Nelson |
| 4,839,203 A | 6/1989 | Davis et al. |
| 4,919,865 A | 4/1990 | Nelson |
| 4,941,893 A | 7/1990 | Hsieh et al. |
| 4,942,091 A | 7/1990 | Umezawa et al. |
| 4,970,034 A | 11/1990 | Ly et al. |
| 5,082,476 A | 1/1992 | Kahlbaugh et al. |
| 5,104,537 A | 4/1992 | Stifelman et al. |
| 5,131,928 A | 7/1992 | Blackman et al. |
| 5,152,811 A | 10/1992 | Sanders, Jr. et al. |

(Continued)

OTHER PUBLICATIONS

Bognitzki, M. et al., "Preparation of Fibers with Nanoscaled Morphologies: Electrospinning of Polymer Blends," *Polymer Engineering and Science*, vol. 41, No. 6, pp. 982-989 (Jun. 2001).

(Continued)

*Primary Examiner* — Krishnan S Menon
(74) *Attorney, Agent, or Firm* — Pauly, DeVries Smith & Deffner, L.L.C.

(57) ABSTRACT

A polymer alloy has been developed comprising a polysulfone and a vinyl lactam polymer. The resulting alloy has excellent thermal characteristics and even in the presence of substantial quantities in vinyl lactam polymers, has solvent resistance to both organic and aqueous solvent materials. The materials, when dissolved in solvents, can be spun from a variety of solvents into a variety of useful fiber materials. The resulting fine fiber, microfiber and nanofiber materials have excellent thermal and chemical resistance for a variety of fiber applications. The polymer alloys of the invention can be spun into nanofiber mats that can act as a filtration media and can also be combined into conventional substrate materials for fabrication into filter structures.

12 Claims, 13 Drawing Sheets

U.S. PATENT DOCUMENTS

| | | |
|---|---|---|
| 5,230,956 A | 7/1993 | Cole et al. |
| 5,238,474 A | 8/1993 | Kahlbaugh et al. |
| 5,364,456 A | 11/1994 | Kahlbaugh et al. |
| 5,389,433 A | 2/1995 | Chang et al. |
| 5,399,431 A | 3/1995 | Miess et al. |
| 5,480,552 A | 1/1996 | Soltys et al. |
| 5,480,554 A | 1/1996 | Degen et al. |
| 5,527,467 A | 6/1996 | Ofsthun et al. |
| 5,534,335 A | 7/1996 | Everhart et al. |
| 5,613,992 A | 3/1997 | Engel |
| 5,641,450 A | 6/1997 | Kobayashi et al. |
| 5,672,399 A | 9/1997 | Kahlbaugh et al. |
| 5,683,916 A | 11/1997 | Goffe et al. |
| 5,690,873 A | 11/1997 | Harwood et al. |
| 5,789,492 A | 8/1998 | Brekner et al. |
| 5,811,205 A | 9/1998 | Andrieu et al. |
| 5,820,646 A | 10/1998 | Gillingham et al. |
| 5,834,839 A | 11/1998 | Mertol |
| 5,853,442 A | 12/1998 | Glen et al. |
| 5,853,884 A | 12/1998 | Nichols et al. |
| 5,914,154 A | 6/1999 | Nemser |
| 5,954,849 A | 9/1999 | Berkhoel et al. |
| 5,979,669 A | 11/1999 | Kitajima et al. |
| D425,189 S | 5/2000 | Gillingham et al. |
| 6,130,292 A | 10/2000 | Harwood et al. |
| 6,132,839 A | 10/2000 | Reader |
| 6,170,671 B1 | 1/2001 | Kitajima et al. |
| 6,217,540 B1 | 4/2001 | Yazawa et al. |
| 6,303,069 B1 | 10/2001 | Anhalt et al. |
| 6,328,167 B1 | 12/2001 | Seshimoto et al. |
| 6,395,046 B1 | 5/2002 | Emig et al. |
| 6,488,865 B1 | 12/2002 | Soroushian |
| 6,495,292 B1 | 12/2002 | Yen |
| 6,616,971 B2 | 9/2003 | Evans |
| 6,673,136 B2 | 1/2004 | Gillingham et al. |
| 6,716,274 B2 | 4/2004 | Gogins et al. |
| 6,740,142 B2 | 5/2004 | Buettner et al. |
| 6,743,273 B2 | 6/2004 | Chung et al. |
| 6,746,517 B2 | 6/2004 | Benson et al. |
| 6,759,474 B1 | 7/2004 | Keener et al. |
| 6,783,711 B2 | 8/2004 | Kurth et al. |
| 6,800,117 B2 | 10/2004 | Barris et al. |
| 6,837,996 B2 | 1/2005 | Kurth et al. |

OTHER PUBLICATIONS

Cabasso et al., "Porosity and Pore Size Determination in Polysulfone Hollow Fibers", *Journal of Applied Polymer Science*, vol. 21, pp. 1883-1900 (1977).

Cabasso et al., "Polysulfone Hollow Fibers. II. Morphology", *Journal of Applied Polymer Science*, vol. 21, pp. 165-180 (1977).

Choi, J. et al., "Effect of organosoluble salts on the nanofibrous structure of electrospun poly(3-hydroxybutyrate-co-3-hydroxyvalerate)," *International Journal of Biological Macromolecules*, vol. 34, pp. 249-256 (2004).

Deimede, V. et al., "Miscibility Behavior of Polybenzimidazole/Sulfonated Polysulfone Blends for Use in Fuel Cell Applications," *Macromolecules*, vol. 33, No. 20, pp. 7609-7617 (2000).

Filip, D. et al., "Thermogravimetric analysis of polyurethane-polysulfone blends," *Polymer International*, vol. 51, pp. 699-706 (2002).

Häubler, L. et al., "The influence of multiblock copolymers containing polysulfone and poly(tetramethylene oxide) segments on the phase behavior in polymer blends," *Thermochimica Acta*, vol. 339, pp. 87-93 (1999).

Hayashi, M. et al., "The influence of wettability on the morphology of blends of polysulfones and polyamides," *Polymer*, vol. 39, No. 2, pp. 299-308 (1998).

Hwang, J. et al., "Effects of Molecular Weight of Polysulfone on Phase Separation Behavior for Cyanate Ester/Polysulfone Blends," *Journal of Applied Polymer Science*, vol. 77, pp. 921-927 (2000).

Johnson, J., "Hydrocarbon Oxidation in a Diesel Catalytic Converter," *Thesis Submitted to the Faculty of the Graduate School of the University of Minnesota*, pp. i-xii and 1-60 (Oct. 13, 1993).

Kim, S. et al., "Effect of Ionic Salts on the Processing of Poly(2-acrylamido-2-methyl-1-propane sulfonic acid) Nanofibers," *Journal of Applied Polymer Science*, vol. 96, pp. 1388-1393 (2005).

Lee, S. et al., "Virus-Based Fabrication of Micro- and Nanofibers Using Electrospinning," *Nano Letters*, vol. 4, No. 3, pp. 387-390 (Mar. 2004).

Li, D. et al., "Nanofibers of Conjugated Polymers Prepared by Electrospinning with a Two-Capillary Spinneret," *Advanced Materials*, vol. 16, No. 22, pp. 2062-2066 (Nov. 18, 2004).

Li, X. et al., "Non-porous ultra-high specific surface ultrafine fibers," *Chinese Science Bulletin*, vol. 49, No. 22, pp. 2368-2371 (Nov. 2004).

Louis, C. et al., "Morphological, thermal and mechanical properties of rubber and polysulfone blends," *Polymer*, vol. 42, pp. 7107-7115 (2001).

Mit-uppatham, C. et al., "Ultrafine Electrospun Polyamide-6 Fibers: Effect of Solution Conditions on Morphology and Average Fiber Diameter," *Macromolecular Chemistry and Physics*, vol. 205, pp. 2327-2338 (2004).

Oyanguren, P. et al., "Development of bicontinuous morphologies in polysulfone-epoxy blends," *Polymer*, vol. 40, pp. 5249-5255 (1999).

"PVP (Polyvinylpyrrolidone) Property Chart," *International Specialty Products*, 2 pages (Oct. 21, 2003).

"PVP Polyvinylpyrrolidone Polymers," *International Specialty Products*, pp. 1-13.

Sen, D. et al., "Small-Angle X-Ray Scattering Study of Porous Polysulfone and Poly(Vinyl Pyrrolidone)/Polysulfone Blend Membranes," *J. Macromol. Sci.-Phys.*, vol. B39, No. 2, pp. 235-243 (2000).

"Standard Test Method for Surface Wettability and Absorbency of Sheeted Materials Using an Automated Contact Angle Tester," *ASTM International Designation: D 5725-99 (Reapproved 2003)*, pp. 1-7 (2003).

Woo, T. et al., "Poly(amic ester-co-imides) with Different Ratios of Amic Ester and Imide Moieties: Thermally Stable Precursors for Copolyimides," *Bull. Korean Chem. Soc.*, vol. 20, No. 2, pp. 1-3 (1999).

Yang, Q. et al., "Influence of Solvents on the Formation of Ultrathin Uniform Poly(vinyl pyrrolidone) Nanofibers with Electrospinning," *Journal of Polymer Science: Part B: Polymer Physics*, vol. 42, pp. 3721-3726 (2004).

Yoo, J. et al., "Novel ultrafiltration membranes prepared from the new miscible blends of polysulfone with poly(1-vinylpyrrolidone-co-styrene) copolymers," *Journal of Membrane Science*, vol. 216, pp. 95-106 (2003).

Yuan, X. et al., "Morphology of ultrafine polysulfone fibers prepared by electrospinning," *Polymer International*, vol. 53, No. 11, pp. 1704-1710 (Nov. 2004).

POLYSULFONE AND POLY(N-VINYL LACTAM) POLYMER ALLOY AND FIBER AND FILTER MATERIALS MADE OF THE ALLOY

CROSS-REFERENCE TO RELATED APPLICATION(S)

This application is a divisional application of U.S. application Ser. No. 11/272,429, filed Nov. 10, 2005, now U.S. Pat. No. 7,641,055 the contents of which is incorporated herein it its entirety

FIELD OF THE INVENTION

The invention relates to polymer alloy material. Such a polymer alloy has properties that can be used in making a fiber or fabricating a fibrous structure. Such a fiber structure can be use in filtration applications due to environmental stability and filtration efficiency. The medium has high strength, efficiency, resistance to moisture and high capacity for filtration of particulate from a fluid (gas or liquid) stream. The filter medium or media comprise a non-woven web suitable for removal of particulate from mobile fluids such as a gas, an aqueous stream or non-aqueous streams including air, waste gas, fuels, lubricating oils and hydraulic fluids. The invention relates to non-woven media layers obtaining sufficient wet strength, particulate efficiency, permeability and other properties to survive the common operating conditions, such as variation in flow rate, temperature, pressure and particulate loading while removing substantial particulate loads from the fluid stream. Lastly, the invention relates to a method of filtering gaseous and aqueous and non-aqueous liquids.

BACKGROUND OF THE INVENTION

The invention relates to a polymer alloy of a polysulfone and an N-vinyl lactam polymer. The invention relates to fibers made from the alloy and applications of the alloy fiber. One important application is in fiber containing filter structures. Fine fiber materials are known in the prior art. We are aware of Barris et al., U.S. Pat. No. 4,650,506 teaching a method of spinning fine fiber, Kahlbaugh et al., U.S. Pat. No. 5,672,399 teaching a filter structure comprising a separation media and a fine fiber layer in a multilayer structure, and a variety of patents on fine fiber media and filter structures, Chung et al., U.S. Pat. No. 6,743,273; Barris et al., U.S. Pat. No. 6,800,117; Gillingham et al., U.S. Pat. No. 6,673,136; Gogins et al., U.S. Pat. No. 6,716,274; Buettner et al., U.S. Pat. No. 6,740,142; and Benson et al., U.S. Pat. No. 6,746,517.

The art has known for many years that the alloying of polymers to obtain a single glass transition temperature (Tg) material with a homogeneous mixture on a molecular level is difficult and rare. However, such polymer alloys can often obtain important novel properties that can be tailored to specific end uses. Very often the properties of the homogeneous alloy attains the best properties of its individual components. The great majority of polymer mixtures fail to alloy, but forms a two-phase blend after mixing and the mixtures are often characterized by reduced chemical, thermal, physical and structural properties and have two, three or more thermal transition or glass transition temperatures. Further, alloys tend to be transparent and can be processed as though they were single component thermoplastics. While great success has been obtained in the manufacture and use of fine fiber materials in a variety of filtration applications, fine fiber materials can be improved for excellent properties in gaseous or liquid filtration. The materials are improved for use with high temperature stability, and physical and mechanical stability in the presence of organic or aqueous liquids while filtering liquid mobile fluids in filtration applications.

A substantial need exists in the art for such polymer materials in the form of an improved alloy that can be formed into improved nanofiber, microfiber and fine fiber structures. A further substantial need exists for filtration media, filter structures and filtration methods that can be used for removing particulate materials from fluid streams. Fluids streams include both gaseous and liquid streams. Typically gaseous filters are filters for air or industrial waste gas streams. Liquid streams or compositions include aqueous liquids and in particular, non-aqueous liquids such as fuels, lubricating oils and hydraulic fluids. The invention provides such media, filtration structures and methods that are stable to the condition found in filtering gaseous streams, air streams, aqueous and non-aqueous liquid streams. The polymer alloy fiber and provides a unique media or media layer combinations that achieve improved filtration properties including substantial permeability, high wet strength, substantial efficiency and long filtration life.

BRIEF DISCUSSION OF THE INVENTION

We have found a polymer alloy can be formed from a polysulfone and an N-vinyl lactam polymer (a poly(N-vinyl lactam)). The alloy comprises a material with a single phase, a single $T_g$ and resistance to aqueous liquids, excellent thermal properties, chemical and solvent resistance and the characteristic that it can be electrospun into nanofiber and microfiber.

The polymer fine fiber, with a diameter of 0.01 to 10 microns, 0.02 to 5 microns or 0.03 to 1 micron, (microfiber and nanofiber) can be fashioned into useful product formats (e.g., when formed onto a substrate). This fine fiber can be made in the form of an improved microfiltration media structure having layers of filtration materials. The fine fiber layers of the invention comprise a random distribution of fine fibers that can be bonded to form an interlocking net.

Filtration performance is obtained largely as a result of the fine fiber barrier to the passage of particulate. Structural properties of stiffness, strength, pleatability are provided by the substrate to which the fine fiber adhered. The fine fiber interlocking networks have as important characteristics, fine fibers in the form of microfibers or nanofibers and relatively small openings, orifices, pores or spaces between the fibers. Such spaces or pore sizes typically range, between fibers, of about 0.01 to about 25 microns or often about 0.1 to about 10 microns.

The filter products comprise a fine fiber layer formed on a substrate. Substrates can be made from fibers of synthetic, natural sources or mixed synthetic/natural materials. The fine fiber adds less than a micron in thickness to the overall fine fiber plus substrate filter media. In service, the filters can stop incident particulate from passing through the fine fiber layer and can attain substantial surface loadings of trapped particles. The particles comprising dust or other incident particulates rapidly form a dust cake on the fine fiber surface and maintain high initial and overall efficiency of particulate removal.

In general, the technology can be applied to filtering gaseous or liquid systems. In liquid filtering techniques, the collection mechanism is believed to be sieving. In a single layer the efficiency is that of the layer. The composite efficiency in a liquid application is limited by the efficiency of the single layer with the highest efficiency. The liquids would be directed through the media according to the invention, with particulates therein trapped in a sieving mechanism. In liquid filter systems, i.e. wherein the particulate material to be filtered is carried in a liquid, such applications include aqueous and non-aqueous and mixed aqueous/non-aqueous applications such as water streams, lube oil, hydraulic fluid, fuel filter systems or mist collectors. Aqueous streams include natural and man-made streams such as effluents, cooling water, process water, etc. Non-aqueous streams include gasoline, diesel fuel, petroleum and synthetic lubricants, hydraulic fluid, brake fluid and other ester based working fluids, cutting oils, food grade oil, etc. Mixed streams include dispersions comprising water in oil and oil in water compositions and aerosols comprising water and a non-aqueous component. Other aqueous or mixed streams of relevance include fluids in the biological, pharmaceutical, and food industries. These fluids include those in the dairy product manufacturing, blood separations, virus and bacteria removal, etc.

BRIEF DISCUSSION OF THE DRAWINGS

Figure 21:
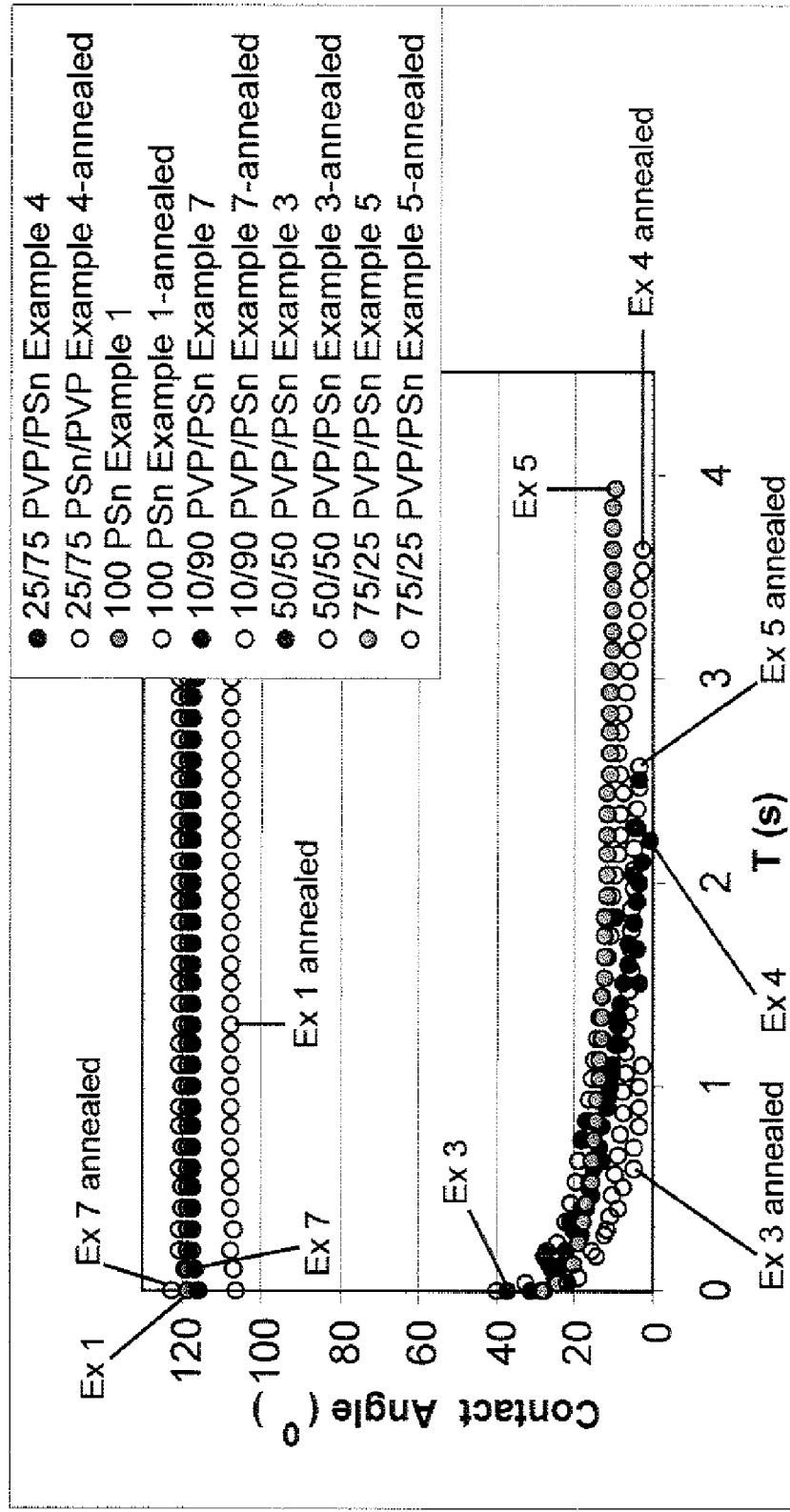

FIG. 21 is a measure of the wettability or hydrophobicity of certain of the fibers from the experimental section showing that the alloy fiber containing a substantial proportion of polyvinyl pyrrolidone is substantially wettable and hydrophilic as measured by the contact angle measurement of the measuring procedure. Such a material can be used in aqueous filtration at low pressure drop and acceptable efficiency.

DETAILED DISCUSSION OF THE INVENTION

The invention relates to an improved alloy material, nanofiber and microfiber materials made from the improved alloy and to filtration materials and methods including the fiber made from the alloy material.

The polymer materials as disclosed herein have substantially improved resistance to the undesirable effects of heat, humidity, aqueous liquids, solvent streams, high flow rates, high particle loads, reverse pulse cleaning, operational abrasion, submicron particulates, cleaning of filters in use and other demanding conditions in both gas and liquid filtration. The improved microfiber and nanofiber performance is a result of the improved character of the polymeric materials forming the microfiber or nanofiber. Further, the filter media of the invention using the improved polymeric materials of the invention provides a number of advantageous features including higher efficiency, lower flow restriction, high durability (stress related or environmentally related) in the presence of abrasive particulates and a smooth outer surface free of loose fibers or fibrils. The overall structure of the filter materials provides an overall thinner media allowing improved media area per unit volume, reduced velocity through the media, improved media efficiency and reduced flow restrictions.

The fine fiber can be made of the polymer alloy or a polymer alloy plus additive or other material. The polymer alloy can be formed into single chemical specie such that it shows a single $T_g$ and the Differential Scanning Calorimeter analysis reveals a single polymeric material. Such a material, when combined with a useful additive material, can form a surface coating of the additive on the microfiber that provides oleophobicity, hydrophobicity or other associated improved stability when contacted with high temperature, high humidity and difficult operating conditions. Such microfibers can have a smooth surface comprising a discrete layer of the additive material or an outer coating of the additive material that is partly solubilized or alloyed in the polymer surface, or both structures.

The alloy of the invention includes a polysulfone and a poly (N-vinyl lactam).

Polysulfones

A polysulfone is characterized by the presence of the sulfone group in a polymer as part of its repeating unit. Whereas polysulfones may be aliphatic or aromatic, the term polysulfones in this disclosure is used typically to denote aromatic polysulfones having the following polymer motif:

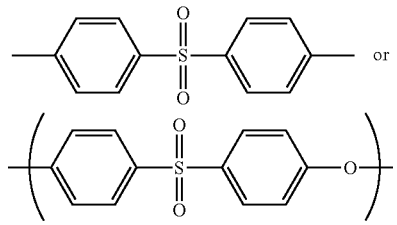

Polysulfones are a class of amorphous thermoplastic polymers characterized by high glass-transition temperatures, good mechanical strength and stiffness, and outstanding thermal and oxidative resistance. These polymers are characterized by the presence of the para-linked diphenylsulfone group as part of their backbone repeat units.

In addition to sulfone, phenyl units, and ether moieties, the main backbone of polysulfones can contain a number of other connecting units. The most notable such connecting group is the isopropylidene linkage that is part of the repeat unit of the well-known bisphenol A-based polysulfone. In order to clearly describe the chemical makeup of polysulfones it is necessary to refer to the chemistry used to synthesize them. There are several routes for the synthesis of polysulfones, but the one that has proved to be most practical and versatile over the years is by aromatic nucleophilic substitution. This polycondensation route is based on reaction of essentially equimolar quantities of 4,4'-dihalodiphenylsulfone (usually dichlorodiphenylsulfone (DCDPS)) with a bisphenol in the presence of base thereby forming the aromatic ether bonds and eliminating an alkali salt as a by-product. This route is employed almost exclusively for the manufacture of polysulfones on a commercial scale. Typical polysulfones include:

| Polymer | Repeat Unit Structure |
|---|---|
| Polysulfone Bisphenol A polysulfone | |

| Polymer | Repeat Unit Structure |
|---|---|
| Polyethersulfone | ![structure] |
| Polyphenylsulfone | ![structure] |

These three commercially important polysulfones referred generically by the common names polysulfone (PST), polyethersulfone (PES), and polyphenylsulfone (PPSF). The repeat units of these polymers are shown above. Other polysulfones are known.

Polymerization

Commercial synthesis of poly(arylethersulfone)s is accomplished almost exclusively via the nucleophilic substitution polycondensation route. This synthesis route involves reaction of the bisphenol of choice with 4,4'-dichlorodiphenylsulfone in a dipolar aprotic solvent in the presence of an alkali base. The rate of polymerization in this type of reaction depends on both the basicity of the bisphenol salt and the electron-withdrawing capacity of the activating group (in this case sulfone) in the dihalide monomer.

The preferred polysulfone polymer comprises an aromatic polysulfone polymer having the structure:

Polysulfone Bisphenol A polysulfone:

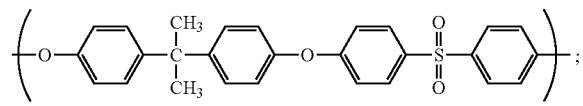

wherein the polymer has the following selected properties of preferred polysulfone:

Solvay's UDEL 1700:

| Property | Method | Units | Value |
|---|---|---|---|
| *Mechanical* | | | |
| Tensile strength at yield | D 638 | Psi | 10,200 |
| | | MPa | 70 |
| Tensile strength at yield | D 638 | Psi | 8500 |
| | | MPa | 59 |
| Tensile elongation at yield | D 638 | % | 5.7 |
| Tensile elongation at break | D 638 | % | 50-100 |
| Tensile modulus | D 638 | kpsi | 360 |
| | | MPa | 2,480 |
| Flexural strength | D 790 | psi | 15,400 |
| | | MPa | 106 |
| Flexural modulus | D 790 | psi | 390 |
| | | MPa | 2,690 |
| Compressive strength | D 695 | kpsi | 13.9 |
| | | MPa | 69 |
| Compressive modulus | D 695 | kpsi | 374 |
| | | MPa | 2.58 |
| Shear (yield) strength, | D 732 | kpsi | 6 |

Solvay's UDEL 1700: -continued

| Property | Method | Units | Value |
|---|---|---|---|
| MPa | | MPa | 41 |
| Notched Izod impact | D 256 | ft-lb/in$^2$ | 1.3 |
| | | J/m | 69 |
| Tensile impact | D 1822 | ft-lb/in$^2$ | 200 |
| | | kJ/m$^2$ | 420 |
| Poisson ratio | E 132 | | 0.37 |
| Rockwell hardness | D 785 | | M69 |
| Abrasion resistance Taber test using CS-17 wheel and 1000 g load for 1000 cycles, mg/1000 cycles | | | 20 |
| *Miscellaneous* | | | |
| Color | | | light amber |
| Haze @ 0.10" thickness | D 1003 | % | 2 |
| Light transmittance @ 0.10" thickness | D 1003 | % | 85 |
| Refractive index | | | 1.634 |
| Density | D 792 | g/cm$^3$ | 1.24 |
| Glass-transition temperature | D 3418 | °C. | 185 |
| Heat deflection temperature | D 648 | °C. | 174 |
| Melt Flow index. Melt flow condition 343° C., 2.16 Kg | D 1238 | g/ml | 5.0-9.0 |
| Coefficient of thermal expansion | D 696 | ppm/°F. | 31 |
| | | ppm/°C. | 56 |
| Thermal conductivity | E 1530 | Btu-in/hr-ft$^2$-F. | 1.80 |
| | | W/(m·K) | 0.26 |
| Water absorption, 24 hours @ 23° C. | D 570 | % | 0.3 |
| Mold shrinkage | D 955 | in/in | 0.007 |
| | | cm/cm | 0.007 |

The characteristic feature of each of the polymers in the table is the highly resonant diaryl sulfone grouping. As a consequence of the sulfur atom being in its highest state of oxidation and the enhanced resonance of the sulfone group being in the para position, these resins offer outstanding thermal stability and resistance to thermal oxidation. The thermal stability is further augmented by the high bond dissociation energies inherent in the aromatic backbone structure. As a result, these polymers can be melt fabricated at temperatures of up to 400° C. with no adverse consequences. Mechanical properties of aromatic polysulfones are intimately tied to backbone structure. For the achievement of good strength and toughness together with favorable melt processing characteristics, the first and foremost requirement is a linear (unbranched) and para-linked structure for the aryl groups in the backbone.

Aromatic polysulfones possess several common key attributes including high glass-transition temperatures (generally >170° C.) and a high degree of thermal oxidative stability. Because PSF, PES, and PPSF are fully amorphous, these resins exhibit optical transparency. The glass-transition temperature of polysulfones produced via nucleophilic polycondensation can be tailored by the choice of the bisphenol. By virtue of the chemically nonlabile aromatic ether backbone, these polymers exhibit superb resistance to hydrolysis in hot water and steam environments.

| Typical Physical and Thermal Properties of PSF, PES, and PPSF | | | |
|---|---|---|---|
| Property | PSF | PES | PPSF |
| Color | light yellow | light | light |
| Haze As measured on 3.1-mm thick specimens, % | <7 | <7 amber | <7 amber |
| Light transmittance Typical values; varies with color. All three resins are transparent. (%) | 80 | 70 | 70 |
| Refractive index | 1.63 | 1.65 | 1.67 |
| Density, g/cm$^3$ | 1.24 | 1.37 | 1.29 |
| Glass-transition temperature Onset value as measured by differential scanning calorimetry, ° C. | 185-190 | 220-225 | 220-225 |
| Heat deflection temperature As measured on 3.1-mm thick ASTM specimens under a load of 1.82 MPa (264 psi)., ° C. | 167-174 | 195-204 | 207 |
| Continuous service temperature Practical maximum long-term use temperatures for PSF and PES based on UL 746 thermal rating data; value for PPSF is estimated, ° C. | 160 | 180 | 180 |
| Coefficient of linear thermal expansion | $5.1 \times 10^{-5}$ | $5.5 \times 10^{-5}$ | $5.5 \times 10^{-5}$ |
| Specific heat at 23° C., J/(g · K) | 1.00 | 1.12 | 1.17 |
| Thermal conductivity, W/(m · K) | 0.26 | 0.18 | 0.35 |
| Water absorption, in 24 hours | 0.22 | 0.61 | 0.37 |
| at equilibrium | 0.62 | 2.1 | 1.1 |
| Mold shrinkage, cm/cm | 0.005 | 0.006 | 0.006 |
| Temperature at 10% weight loss Thermogravimetric analysis run at heating rate of 10° C./min and 20 mL/min gas (nitrogen or air) flow rate in nitrogen | 512 | 547 | 550 |
| temperature at 10% weight loss in air | 507 | 515 | 541 |

| Typical Room Temperature Mechanical Properties of PSF, PES, and PPSF | | | |
|---|---|---|---|
| Property | PSF | PES | PPSF |
| Tensile, flexural, and impact properties based on 3.1-mm thick ASTM specimens (yield) strength, MPa$^b$ | 70-71 | 80-83 | 70.0 |
| Tensile modulus, GPa | 2.48 | 2.60 | 2.30 |
| Elongation at yield, % | 5.7 | 6.7 | 7.2 |
| Elongation at break, % | 75 | 25-75 | 60-120 |
| Flexural strength, MPa | 106 | 111 | 91 |
| Flexural modulus, GPa | 2.69 | 2.90 | 2.40 |
| Compressive strength, MPa | 96 | 100 | 99 |
| Compressive modulus, GPa | 2.58 | 2.68 | 1.73 |
| Shear (yield) strength, MPa | 41.4 | 50 | 62 |
| Notched Izod impact, J/m, No break for unnotched samples | 49-69 | 85 | 690-700 |
| Tensile impact, kJ/M$^2$ | 420 | 340 | 400 |
| Poisson ratio, at 0.5% strain | 0.37 | 0.39 | 0.42 |
| Rockwell hardness | M69 | M88 | M86 |
| Abrasion resistance Taber test using CS-17 wheel and 1000 g load for 1000 cycles, mg/1000 cycles | 20 | 19 | 20 |

Furthermore, they can withstand acidic and alkali media over a wide range of concentrations and temperatures.

Polysulfones are rigid and tough, with practical engineering strength and stiffness properties even without reinforcement. Their strength and stiffness at room temperature are high compared to traditional aliphatic backbone amorphous plastics. The polymers exhibit ductile yielding over a wide range of temperatures and deformation rates. The room temperature mechanical properties of bisphenol A, bisphenol S, and bisphenol-based polysulfones are shown above. The tensile and flexural properties as well as resistance to cracking in chemical environments can be substantially enhanced by the addition of fibrous reinforcements such as chopped glass fiber.

Polysulfones exhibit excellent inherent burning resistance characteristics compared to many engineering thermoplastics. The wholly aromatic polysulfones such as PES and PPSF possess particularly outstanding flame retardancy and very low smoke release characteristics.

Polysulfones offer excellent electrical insulative capabilities. The resins exhibit low dielectric constants and dissipation factors even in the $GH_z$ (microwave) frequency range. This performance is retained over a wide temperature range and has permitted many applications.

Blends and Alloys

We have surprisingly found that the polysulfone polymers can be alloyed with an N-vinyl lactam polymer.

The blending of the polysulfone and poly (N-vinyl lactam) polymers is used to tailor existing commercial polymers to specific end use requirements. The blending of polysulfones with polymers presents opportunities, but at the same time poses some significant technical challenges. Miscibility of PSF or PES with any nonsulfone-based polymer is extremely rare. Blends comprising PSF, PES, and PPSF and poly (N-vinyl lactam) are miscible, although their blends form mechanically compatible mixtures with relatively stable phase morphologies.

N-Vinyl Amide Polymers

N-Vinyl amide-based polymers, especially the N-vinyl lactams, such as poly(N-vinyl-2-pyrrolidinone) or simply polyvinyl pyrrolidone (PVP) contain at least some of the following monomer residue,

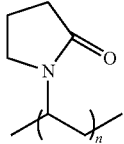

and continue to be of major importance. Because of hydrogen bonding of water to the amide group, many of the N-vinylamide homopolymers are water soluble or dispersible. PVP is soluble in polar solvents like alcohol. The chemistry of PVP, the most commercially successful polymer of the class, in addition to the ability to complex, PVP and its analogues along with a large assortment of copolymers are excellent film formers. They exhibit the ability to interact with a variety of surfaces by hydrogen or electrostatic bonding, resulting I protective coatings and adhesive applications of commercial significance such as hair spray fixtures, tablet binders, disintegrants, idophors, antidye redeposition agents in detergents, protective colloids, dispersants, and solubilizers, among many others.

N-Vinyl amides and N-vinylimides can be prepared by reaction of amides and imides with acetylene, by dehydration of hydroxyethyl derivatives, by pyrolysis of ethylidenebisamides, or by vinyl exchange, among other methods; the monomers are stable when properly stored. Only N-vinyl-2-pyrrolidinone (VP):

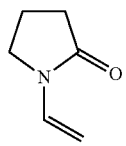

is of significant commercial importance in polymerization. Vinylcaprolactam is available and is growing in importance, and vinyl formamide is available as a developmental monomer. The polymers containing VP, when alloyed with a polysulfone, obtain increased water compatibility without loss of other valuable filtration properties.

Commonly called vinylpyrrolidinone or VP, N-vinyl-2-pyrrolidinone is a clear, colorless liquid that is miscible in all proportions with water and most organic solvents. It can polymerize slowly by itself but can be easily inhibited by small amounts of ammonia, sodium hydroxide (caustic pellets), or antioxidants such as N,N'-di-sec-butyl-p-phenylenediamine.

The lower molecular weight grades (K-15 and K-30) of PVP are prepared industrially with an ammonia/$H_2O_2$ initiation system. Such products are the standards for the pharmaceutical industry and conform to the various national pharmacopeias. The $H_2O_2$/ammonia initiation system is not employed commercially in the manufacture of higher molecular weight homologues; they are prepared with organic initiators. Such polymerizations follow simple chain theory and are usually performed in water commercially. the rate of polymerization is at a maximum in aqueous media at pH 8-10 and at 75 wt % monomer. Polymerization rates follow the polarity and hydrogen bonding capability of the solvent.

Poly(N-vinyl-2-pyrrolidinone) (PVP) is undoubtedly the best-characterized and most widely studied N-vinyl lactam polymer. Commercial success of the material arises from its biological compatibility, low toxicity, film-forming and adhesive characteristics, unusual complexing ability, relatively inert behavior toward salts and acids, and thermal and hydrolytic stability.

Poly(N-vinyl-2-pyrrolidinone) is linear N-vinyl-2-pyrrolidinone groups of varying degrees of polymerization. The molecular weights of PVP samples are determined by size exclusion chromatography (sec), osmometry, ultracentrifugation, light-scattering, and solution viscosity techniques. The most frequently employed method of determining and reporting the molecular weight of PVP samples utilizes the sec/low angle light scattering (lalls) technique.

| Specifications of PVP Grades | |
|---|---|
| Assay | Value (max) |
| K value/$M_w$ | |
| 10-15/600-15,000 | Variation 85-115% |
| 30-120/400,000-3,000,000 | Variation 90-107% |
| Tg, ° C. | 130-176 |
| Moisture, % | 5 |
| pH, of a 5% solution in distilled water | 3.0-7.0 |

| Specifications of PVP Grades | |
|---|---|
| Assay | Value (max) |
| Residue on ignition, % | 0.02 |
| Aldehydes, % (as acetaldehyde) | 0.02 |
| N-vinyl-2-pyrrolidinone, monomer wt % | 0.20 |
| Lead, ppm | 10 |
| Arsenic, ppm | 1 |
| Nitrogen, % | 11.5-12.8 |

The $T_g$ of PVP is sensitive to residual moisture and unreacted monomer. It is even sensitive to how the polymer was prepared, suggesting that MWD, branching, and crosslinking may play a part. Polymers presumably with the same molecular weight prepared by bulk polymerization exhibit lower $T_g$s compared to samples prepared by aqueous solution polymerization, lending credence to an example of branching caused by chain-transfer to monomer.

One of PVP's more outstanding attributes is its solubility in both water and a variety of organic solvents, PVP is soluble in alcohols, acids, ethyl lactate, chlorinated hydrocarbons, amines, glycols, lactams, and nitroparaffins. PVP is insoluble in hydrocarbons, ethers, ethyl acetate, sec-butyl-4-acetate, 2-butanone, acetone, cyclohexanone, and chlorobenzene.

Copolymerization

Copolymerization of N-vinyl monomers with other vinyl monomers can be achieved. Such polymerizations can be conveniently carried out in aqueous solution or in a variety of solvents, depending on monomer/polymer solubilities. Various strategies have been employed to compensate for the divergence in reactivity ratios in order to form uniform (statistical) copolymers such as semibatch or mixed monomer feeds. The first commercially successful class of VP copolymers, poly(vinylpyrrolidinone-co-vinyl acetate) is currently manufactured in sizeable quantities. A wide variety of compositions and molecular weights are available as powders or as solutions in ethanol, isopropanol, or water (if soluble). Desirable properties superior to PVP homopolymer can be specified by judicious selection of the amount of vinyl acetate. Copolymers based on DMAEMA (dimethylaminoethyl methacrylate) in either free amine form or quaternized with diethyl sulfate or methyl chloride have achieved commercial significance. The most successful of these products contain high ratios of VP to DMAEMA and are partially quaternized with diethyl sulfate (Polyquaternium 11). They afford very hard, clear, non-flaking films that are easily removed if needed. More recently, copolymers with methylvinyllimidazolium chloride (Polyquaternium 16) or MAPTAC (methacrylamidoproppyltrimethyl ammonium chloride) (Polyquaternium 28) have been introduced. Unquaternized DMAEMA copolymers afford resins that are mildly cationic and less hydroscopic.

PVP/acrylic acid copolymer in powdered form prepared by precipitation polymerization from heptane has been introduced commercially. A wide variety of compositions and molecular weights are available, from 75/25 to 25/75 wt % VP/AA and from $20 \times 10^3$ to $250 \times 10^3$ molecular weights. The copolymers are insoluble in water unless they are neutralized to some extent with base. They are soluble, however, in various ratios of alcohol and water, suggesting applications where delivery from hydroalcoholic solutions but subsequent insolubility in water is desired, such as in low volatile organic compound (VOC) hair-fixative formulations or tablet coatings. Unneutralized, the $T_g$ is higher than expected, indicating interchain hydrogen bonding.

The preferred N-vinyl lactam polymer comprises a homopolymer of polyvinyl pyrrolidone. The following table exhibits the preferred polymer characteristics.

| Property | PVP K-30 | PVP K-90 |
|---|---|---|
| Appearance @ 25° C. | Off-white, amorphous powder | Off-white, amorphous powder |
| Refractive index | 1.53 | 1.53 |
| K-Value (Viscosity of 1% solution) | 26-35 | 90-100 |
| Color (APHA) | 80 max.[a] | 60 max.[a] |
| % Residual VP | <0.1 | <0.1 |
| % Active | 95 min. | 95 min. |
| % Moisture | 5 max. | 5 max. |
| % Ash (combustion) | 0.02 max. | <0.1 |
| pH (solids as 5%; sol'ns, as is) | 3-7 | 3-7 |
| $M_w$ Range | 40,000-80,000 | 900,000-1,700,000 |
| Brookfield Viscosity, cP | 3 | 150 |
| Film Density (g/cc) | 1.207 | 1.216 |
| Tg (° C.) | 163 | 174 |

We have found that the alloy can be made either by solvent processing or melt processing the polymer materials. In solvent processing, useful amounts of the polymer are combined in solution. Useful solvents include aliphatic polar noncyclic solvents such as halogenated alkanes such as chloroform, 1,2 dichloroethane, and the like, amides, such as N, N-dimethylformamide and N,N dimethylacetamide, or other solvents such as epichlorohydrin and diglyme. Non-aromatic polar cyclic solvent such as ethers, including tetrahydrofuran and dioxane, pyrrolodones, such as 2-methyl pyrrolodone, ketones such as cyclohexanone, and lactones, such as gamma-butyrolactone. Other useful solvents include aromatic solvents such as mono- and di-substituted benzene, including chlorobenzene, o-dichlorobenzene, phenol, o-chlorophenol and the like. Aromatic solvents also include pyridine, aniline and nitrobenzene.

Mixtures of the solvents above and mixtures of these solvents with suitable cosolvents can also be useful solvents. Cosolvents include aliphatic ketones, such as acetone and methyl ethyl ketone, ethers, esters, etc. These solutions can contain an inorganic salt that is substantially or strongly differentiated in aqueous solution. The salt helps to control fiber size. Addition of small amounts of salts can increase the solution conductivity. In turn, this can promote decrease in fiber diameter, disappearance of beads in the fibers, reduce spread of fiber diameter and improve the overall uniformity in the fibrous mat. This effect, which is not fully understood, appears to be very similar across a large number of solvent spinning systems. In our case the addition of an alkali metal halide salt, including NaCl, KCl, LiCl and others aims to achieve these traits, as they translate into tighter distribution of fiber diameter and pore size.

The resulting solution of polysulfone, N-vinyl lactam polymer and solvent is agitated until uniform and the solution obtains increased clarity. The solution of polymers can then be processed into fiber film or other useful structure by spinning the fiber or forming a polymer film while evaporating the solvent.

The alloy materials of the invention can also be made by melt processing. Useful amounts of the polysulfone and the N-vinyl lactam material are combined typically in powder, chipped or pellet form and introduced into a melt processing unit such as an extruder, and formed into an extrudate chip, pellet or linear member comprising the alloy.

We have found that additive materials can significantly improve the properties of the polymer materials in the form of a fine fiber. The resistance to the effects of heat, humidity, impact, mechanical stress and other negative environmental effect can be substantially improved by the presence of additive materials. We have found that while processing the microfiber materials of the invention, that the additive materials can improve the oleophobic character, the hydrophobic character and can appear to aid in improving the chemical stability of the materials. We believe that the fine fibers of the invention in the form of a microfiber are improved by the presence of these oleophobic and hydrophobic additives as these additives form a protective layer coating, ablative surface or penetrate the surface to some depth to improve the nature of the polymeric material. We believe the important characteristics of these materials are the presence of a strongly hydrophobic group that can preferably also have oleophobic character. Strongly hydrophobic groups include fluorocarbon groups, hydrophobic hydrocarbon surfactants or blocks and substantially hydrocarbon oligomeric compositions. These materials are manufactured in compositions that have a portion of the molecule that tends to be compatible with the polymer material affording typically a physical bond or association with the polymer while the strongly hydrophobic or oleophobic group, as a result of the association of the additive with the polymer, forms a protective surface layer that resides on the surface or becomes alloyed with or mixed with the polymer surface layers. The additive can be used at an amount of 1% to 25% by weight total on fiber. For 0.2-micron fiber with 10% additive level, the surface thickness is calculated to be around 50 Å, if the additive has migrated toward the surface. Migration is believed to occur due to the incompatible nature of the oleophobic or hydrophobic groups in the bulk material. A 50 Å thickness appears to be reasonable thickness for protective coating. For 0.05-micron diameter fiber, 50 Å thickness corresponds to 20% mass. For 2 microns thickness fiber, 50 Å thickness corresponds to 2% mass. Preferably the additive materials are used at an amount of about 2 to 25 wt %. Useful surface thickness can range from 10 Å to 150 Å.

Oligomeric additives that can be used in combination with the polymer materials of the invention include oligomers having a molecular weight of about 500 to about 5000, preferably about 500 to about 3000 including fluoro-chemicals, nonionic surfactants and low molecular weight resins or oligomers.

The alloy can be made of a polymer material or a polymer plus additive. One preferred mode of the invention is a polymer blend comprising a first polymer and a second, but different polymer (differing in polymer type, molecular weight or physical property) that is conditioned or treated at elevated temperature. The polymer blend can be reacted and formed into a single chemical specie or can be physically combined into a blended composition by an annealing process. Annealing implies a physical change, like crystallinity, stress relaxation or orientation. Preferred materials are chemically reacted into a single polymeric specie such that a Differential Scanning Calorimeter analysis reveals a single polymeric material. Such a material, when combined with a preferred additive material, can form a surface coating of the additive on the microfiber that provides oleophobicity, hydrophobicity or other associated improved stability when contacted with high temperature, high humidity and difficult operating conditions. The fine fiber of the class of materials can have a diameter of about 0.01 to 5 microns. Such microfibers can have a smooth surface comprising a discrete layer of the additive material or an outer coating of the additive material that is partly solubilized or alloyed in the polymer surface, or both.

The material is heated until the materials are in melt form, the materials are intimately mixed and extruded into a pellet, linear member, or shaped article such as film or other shaped extrudate. The electrostatic spinning process as disclosed in Barris et al., U.S. Pat. No. 4,650,516, can be used to form the microfiber or nanofiber of the unit. A suitable apparatus for forming the fiber is illustrated therein. This apparatus includes a reservoir in which the fine fiber forming polymer solution is contained, a pump and a rotary type emitting device or emitter to which the polymeric solution is pumped. The emitter generally consists of a rotating union, a rotating portion including a plurality of offset holes and a shaft connecting the forward facing portion and the rotating union. The rotating union provides for introduction of the polymer solution to the forward facing portion through the hollow shaft. The holes are spaced around the periphery of the forward facing portion. Alternatively, the rotating portion can be immersed into a reservoir of polymer fed by reservoir 80 and pump 81. Syringe needle spinning can also be used. The rotating portion then obtains polymer solution from the reservoir and as it rotates in the electrostatic field. A droplet of the solution forms fiber as it is accelerated by the electrostatic field toward the collecting media as discussed below.

Facing the emitter, but spaced apart therefrom, is a substantially planar grid upon which the collecting media (i.e. a suitable filtration substrate or combined filtration substrate) is positioned. Air can be drawn through the grid. The collecting media is passed around rollers positioned adjacent opposite ends of grid. A high voltage electrostatic potential is maintained between emitter and grid by means of a suitable electrostatic voltage source or power supply connected to the grid and emitter.

In use, the polymer solution is pumped to the rotating union or reservoir from reservoir. The forward facing portion rotates while liquid exits from holes, or is picked up from a reservoir, and moves from the outer edge of the emitter toward collecting media positioned on grid. Specifically, the electrostatic potential between grid and the emitter imparts a charge to the material that cause liquid to be emitted therefrom as thin fibers which are drawn toward grid where they arrive and are collected on substrate or an efficiency layer. In the case of the polymer in solution, solvent is evaporated from the fibers during their flight to the collection media; therefore, the fibers arrive at and coat the substrate or efficiency layer. The fine fibers bond to the substrate fibers first encountered at the grid. Electrostatic field strength is selected to ensure that the polymer material is accelerated from the emitter to the collecting media; the acceleration is sufficient to render the material into a very thin microfiber or nanofiber structure. Increasing or slowing the advance rate of the collecting media can deposit more or less emitted fibers on the forming media, thereby allowing control of the thickness of each layer deposited thereon. Alternatively, the melt polymer can be melt blown into nanofiber, microfiber or other fine fiber structures using conventional technologies.

The polymer fine fiber, with a diameter of 0.01 to 10 microns, (microfiber and nanofiber) can be fashioned into useful product formats (e.g., when formed onto a substrate). Useful product formats can also be achieved by depositing multiple layers of fine fibers in order to construct a stand-alone nanofiber film with sufficient mechanical strength. One fiber size useful in high efficiency filter ranges from about 0.05 to 0.2 micron. This fine fiber can be made in the form of an improved multi-layer microfiltration media structure. The fine fiber layers of the invention comprise a random distribution of fine fibers that can be bonded to form an interlocking net. The thickness of the typical fine fiber filtration layer ranges from about 1 to 100 times the fiber diameter with a basis weight ranging from about 0.01 to 240 micrograms-$cm^{-2}$.

Filtration performance is obtained largely as a result of the fine fiber barrier to the passage of particulate. Structural properties of stiffness, strength, pleatability are provided by the substrate to which the fine fiber adhered, and/or the fine fiber multiple layered structure. The fine fiber interlocking networks have as important characteristics, fine fibers in the form of microfibers or nanofibers and relatively small openings, orifices or spaces between the fibers. Such spaces typically range, between fibers, of about 0.01 to about 25 microns or often about 0.1 to about 10 microns.

The filter products comprise a fine fiber layer formed on a substrate. Fibers from synthetic, natural sources (e.g., polyester and cellulose layers) are thin, appropriate substrate choices. In service, the filters can stop incident particulate from passing through the fine fiber layer and can attain substantial surface loadings of trapped particles. The particles comprising dust or other incident particulates rapidly form a dust cake on the fine fiber surface and maintain high initial and overall efficiency of particulate removal. Even with relatively fine contaminants having a particle size of about 0.01 to about 1 micron, the filter media comprising the fine fiber has a very high dust capacity.

The polymer materials as disclosed herein have substantially improved resistance to the undesirable effects of heat, humidity, high flow rates, reverse pulse cleaning, operational abrasion, submicron particulates, cleaning of filters in use and other demanding conditions. The improved microfiber and nanofiber performance is a result of the improved character of the polymeric materials forming the microfiber or nanofiber. Further, the filter media of the invention using the improved polymeric materials of the invention provides a number of advantageous features including higher efficiency, lower flow restriction, high durability (stress related or environmentally related) in the presence of abrasive particulates and a smooth outer surface free of loose fibers or fibrils. The overall structure of the filter materials provides an overall thinner media allowing improved media area per unit volume, reduced velocity through the media, improved media efficiency and reduced flow restrictions.

A general understanding of some of the basic principles and problems of gas, air and liquid filter design can be understood by consideration of the following types of filter media: surface loading media; and, depth media. Each of these types of media has been well studied, and each has been widely utilized. Certain principles relating to them are described, for example, in Kahlbaugh et al., U.S. Pat. No. 5,082,476; Kahlbaugh et al., U.S. Pat. No. 5,238,474; and Kahlbaugh et al., U.S. Pat. No. 5,364,456. The complete disclosures of these three patents are incorporated herein by reference.

Fluid streams such as air and gas streams often carry particulate material therein. The removal of some or all of the particulate material from the fluid stream is needed. For example, air intake streams to the cabins of motorized vehicles, air in computer disk drives, HVAC air, clean room ventilation and applications using filter bags, barrier fabrics, woven materials, air to engines for motorized vehicles, or to power generation equipment; gas streams directed to gas turbines; and, air streams to various combustion furnaces, often include particulate material therein. In the case of cabin air filters it is desirable to remove the particulate matter for comfort of the passengers and/or for aesthetics. With respect to air and gas intake streams to engines, gas turbines and combustion furnaces, it is desirable to remove the particulate material because particulate can cause substantial damage to the internal workings to the various mechanisms involved. In other instances, production gases or off gases from industrial processes or engines may contain particulate material therein. Before such gases can be, or should be, discharged through various downstream equipment to the atmosphere, it may be desirable to obtain a substantial removal of particulate material from those streams.

Paper filter elements are widely used forms of surface loading media. In general, paper elements comprise dense mats of cellulose, synthetic or other fibers oriented across a gas stream carrying particulate material. The paper is generally constructed to be permeable to the gas flow, and to also have a sufficiently fine pore size and appropriate porosity to inhibit the passage of particles greater than a selected size therethrough. As the gases (fluids) pass through the filter paper, the upstream side of the filter paper operates through diffusion and interception to capture and retain selected sized particles from the gas (fluid) stream. The particles are collected as a dust cake on the upstream side of the filter paper. In time, the dust cake also begins to operate as a filter, increasing efficiency. This is sometimes referred to as "seasoning," i.e. development of an efficiency greater than initial efficiency.

A simple filter design such as that described above is subject to at least two types of problems. First, a relatively simple flaw, i.e. rupture of the paper, results in failure of the system. Secondly, particulate material rapidly builds up on the upstream side of the filter, as a thin dust cake or layer, increasing the pressure drop. Various methods have been applied to increase the "lifetime" of surface-loaded filter systems, such as paper filters. One method is to provide the media in a pleated construction, so that the surface area of media encountered by the gas flow stream is increased relative to a flat, non-pleated construction. While this increases filter lifetime, it is still substantially limited. For this reason, surface loaded media has primarily found use in applications wherein relatively low velocities through the filter media are involved, generally not higher than about 20-30 feet per minute and typically on the order of about 10 feet per minute or less. The term "velocity" in this context is the average velocity through the media (i.e. flow volume per media area).

In general, as air flow velocity is increased through a pleated paper media, filter life is decreased by a factor proportional to the square of the velocity. Thus, when a pleated paper, surface loaded, filter system is used as a particulate filter for a system that requires substantial flows of air, a relatively large surface area for the filter media is needed. For example, a typical cylindrical pleated paper filter element of an over-the-highway diesel truck will be about 9-15 inches in diameter and about 12-24 inches long, with pleats about 1-2 inches deep. Thus, the filtering surface area of media (one side) is typically 30 to 300 square feet.

In many applications, especially those involving relatively high flow rates, an alternative type of filter media, sometimes generally referred to as "depth" media, is used. A typical depth media comprises a relatively thick tangle of fibrous material. Depth media is generally defined in terms of its porosity, density or percent solids content. For example, a 2-3% solidity media would be a depth media mat of fibers arranged such that approximately 2-3% of the overall volume comprises fibrous materials (solids), the remainder being air or gas space.

Another useful parameter for defining depth media is fiber diameter. If percent solidity is held constant, but fiber diameter (size) is reduced, pore size or interfiber space is reduced; i.e. the filter becomes more efficient and will more effectively trap smaller particles.

A typical conventional depth media filter is a deep, relatively constant (or uniform) density, media, i.e. a system in which the solidity of the depth media remains substantially constant throughout its thickness. By "substantially constant" in this context, it is meant that only relatively minor fluctuations in density, if any, are found throughout the depth of the media. Such fluctuations, for example, may result from a slight compression of an outer engaged surface, by a container in which the filter media is positioned.

Gradient density depth media arrangements have been developed. some such arrangements are described, for example, in Kahlbaugh et al., U.S. Pat. No. 5,082,476; Kahlbaugh et al., U.S. Pat. No. 5,238,474; and Kahlbaugh et al., U.S. Pat. No. 5,364,456. In general, a depth media arrangement can be designed to provide "loading" of particulate materials substantially throughout its volume or depth. Thus, such arrangements can be designed to load with a higher amount of particulate material, relative to surface loaded systems, when full filter lifetime is reached. However, in general the tradeoff for such arrangements has been efficiency, since, for substantial loading, a relatively low solidity media is desired. Gradient density systems such as those in the patents referred to above, have been designed to provide for substantial efficiency and longer life. In some instances, surface-loading media is utilized as a "polish" filter in such arrangements.

A filter media construction according to the present invention includes a first layer of permeable coarse fibrous media or substrate having a first surface. A first layer of fine fiber media is secured to the first surface of the first layer of permeable coarse fibrous media. Preferably the first layer of permeable coarse fibrous material comprises fibers having an average diameter of at least 10 microns, typically and preferably about 12 (or 14) to 30 microns. Also preferably the first layer of permeable coarse fibrous material comprises a media having a basis weight of no greater than about 200 grams/meter$^2$, preferably about 0.50 to 150 g/m$^2$, and most preferably at least 8 g/m$^2$. Preferably the first layer of permeable coarse fibrous media is at least 0.0005 inch (12 microns) thick, and typically 0.0006 to 0.02 (15 to 500 microns) thick and preferably is about 0.001 to 0.030 inch (25-800 microns) thick.

In preferred arrangements, the first layer of permeable coarse fibrous material comprises a material which, if evaluated separately from a remainder of the construction by the Frazier permeability test, would exhibit a permeability of at least 1 meter(s)/min, and typically and preferably about 2-900 meters/min. Herein when reference is made to efficiency, unless otherwise specified, reference is meant to efficiency when measured according to ASTM-1215-89, with 0.78μ monodisperse polystyrene spherical particles, at 20 fpm (6.1 meters/min) as described herein.

Preferably the layer of fine fiber material secured to the first surface of the layer of permeable coarse fibrous media is a layer of nano- and microfiber media wherein the fibers have average fiber diameters of no greater than about 2 to 10 microns, generally and preferably no greater than about 5 microns, and typically and preferably have at least some fiber with diameters smaller than 0.5 micron and within the range of about 0.05 to 0.5 micron. Also, preferably the first layer of fine fiber material secured to the first surface of the first layer of permeable coarse fibrous material has an overall thickness that is no greater than about 50 microns or in certain applications about 30 microns, more preferably no more than 20 microns, most preferably no greater than about 10 microns, and typically and preferably that is within a thickness of about 1-8 times (and more preferably no more than 5 times) the fine fiber average diameter of the layer.

Certain preferred arrangements according to the present invention include filter media as generally defined, in an overall filter construction. Some preferred arrangements for such use comprise the media arranged in a cylindrical, pleated configuration with the pleats extending generally longitudinally, i.e. in the same direction as a longitudinal axis of the cylindrical pattern. For such arrangements, the media may be imbedded in end caps, as with conventional filters. Such arrangements may include upstream liners and downstream liners if desired, for typical conventional purposes.

In some applications, media according to the present invention may be used in conjunction with other types of media, for example conventional media, to improve overall filtering performance or lifetime. For example, media according to the present invention may be laminated to conventional media, be utilized in stack arrangements; or be incorporated (an integral feature) into media structures including one or more regions of conventional media. It may be used upstream of such media, for good load; and/or, it may be used downstream from conventional media, as a high efficiency polishing filter.

Certain arrangements according to the present invention may also be utilized in liquid filter systems, i.e. wherein the particulate material to be filtered is carried in a liquid. Also, certain arrangements according to the present invention may be used in mist collectors, for example arrangements for filtering fine mists from air.

According to the present invention, methods are provided for filtering. The methods generally involve utilization of media as described to advantage, for filtering. As will be seen from the descriptions and examples below, media according to the present invention can be specifically configured and constructed to provide relatively long life in relatively efficient systems, to advantage.

Various filter designs are shown in patents disclosing and claiming various aspects of filter structure and structures used with the filter materials. Engel et al., U.S. Pat. No. 4,720,292, disclose a radial seal design for a filter assembly having a generally cylindrical filter element design, the filter element being sealed by a relatively soft, rubber-like end cap having a cylindrical, radially inwardly facing surface. Kahlbaugh et al., U.S. Pat. No. 5,082,476, disclose a filter design using a depth media comprising a foam substrate with pleated components combined with the microfiber materials of the invention. Stifelman et al., U.S. Pat. No. 5,104,537, relate to a filter structure useful for filtering liquid media. Liquid is entrained into the filter housing, passes through the exterior of the filter into an interior annular core and then returns to active use in the structure. Such filters are highly useful for filtering hydraulic fluids. Engel et al., U.S. Pat. No. 5,613,992, show a typical diesel engine air intake filter structure. The structure obtains air from the external aspect of the housing that may or may not contain entrained moisture. The air passes through the filter while the moisture can pass to the bottom of the housing and can drain from the housing. Gillingham et al., U.S. Pat. No. 5,820,646, disclose a Z filter structure that uses a specific pleated filter design involving plugged passages that require a fluid stream to pass through at least one layer of filter media in a "Z" shaped path to obtain proper filtering performance. The filter media formed into the pleated Z shaped format can contain the fine fiber media of the invention. Glen et al., U.S. Pat. No. 5,853,442, disclose a bag house structure having filter elements that can contain the fine fiber structures of the invention. Berkhoel et al., U.S. Pat. No. 5,954,849, show a dust collector structure useful in processing typically air having large dust loads to filter dust from an air stream after processing a workpiece generates a significant dust load in an environmental air. Lastly, Gillingham, U.S. Design Pat. No. 425,189, discloses a panel filter using the Z filter design.

EXPERIMENTAL

Example 1

A polymer solution was obtained by combining polymer and solvent in a 500 ml glass kettle with 3-neck lid, to which mechanical stirring, a temperature probe, and a condenser were attached. The vessel placed in a heating mantle and the temperature controlled at 60° C. under with constant agitation until a uniform solution was obtained. The solution was cooled at room temperature before electrospinning.

Solution composition: 20% solids, with a composition of 100% polysulfone, UDEL 1700 (from Solvey), polymer by weight and a solvent composition of 50% THF and 50% DMF by weight.

Electrospinning conditions: Solution electrospun onto aluminum substrate via a syringe, which flow is controlled through a syringe pump at 0.1 ml/min. The distance between the tip (needle) of the syringe and the aluminum substrate at 6 inches. Applied voltage of 25 Kvolts.

Example 2

A polymer solution was obtained as in Example 1 by combining polymer and solvent in a container with constant agitation until a uniform solution was obtained.

Solution composition: 30% solids, with a composition of 100% PVP, Luvitec K30 (from BASF), by weight and a solvent composition of 34% THF and 66% DMF by weight.

Electrospinning conditions: Solution electrospun onto aluminum substrate via a syringe, which flow is controlled through a syringe pump at 0.1 ml/min. The distance between the tip (needle) of the syringe and the aluminum substrate at 6 inches. Applied voltage of 17 Kvolts.

Example 3

A polymer solution was obtained as in Example 1 by combining the polymers and solvent in a container with constant agitation until a uniform solution was obtained.

Solution composition: 20% solids, with a composition of polysulfone 50%, UDEL 1700 (from Solvey), and 50% PVP, Luvitec K30 (from BASF), by weight, in solutions of a solvent composition of 50% THF and 50% DMF by weight.

Figure 4:
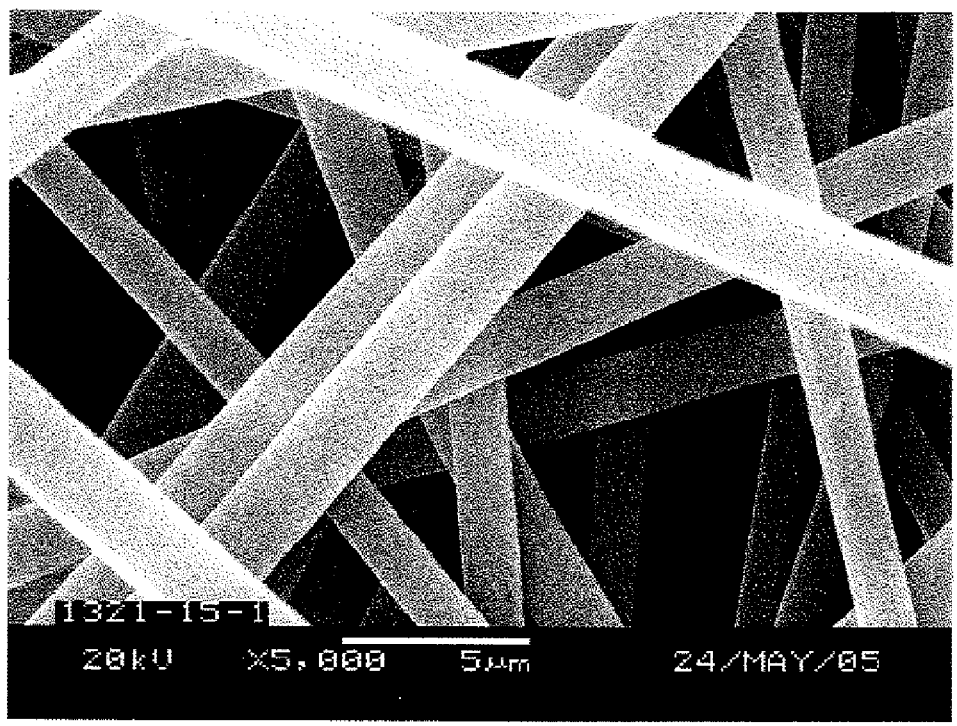
FIGS. 4-20 are electron microscope SEM photo micrographs of a variety of the spun microfiber materials derived from the electrospinning experiments from the experimental section.
Figure 5:
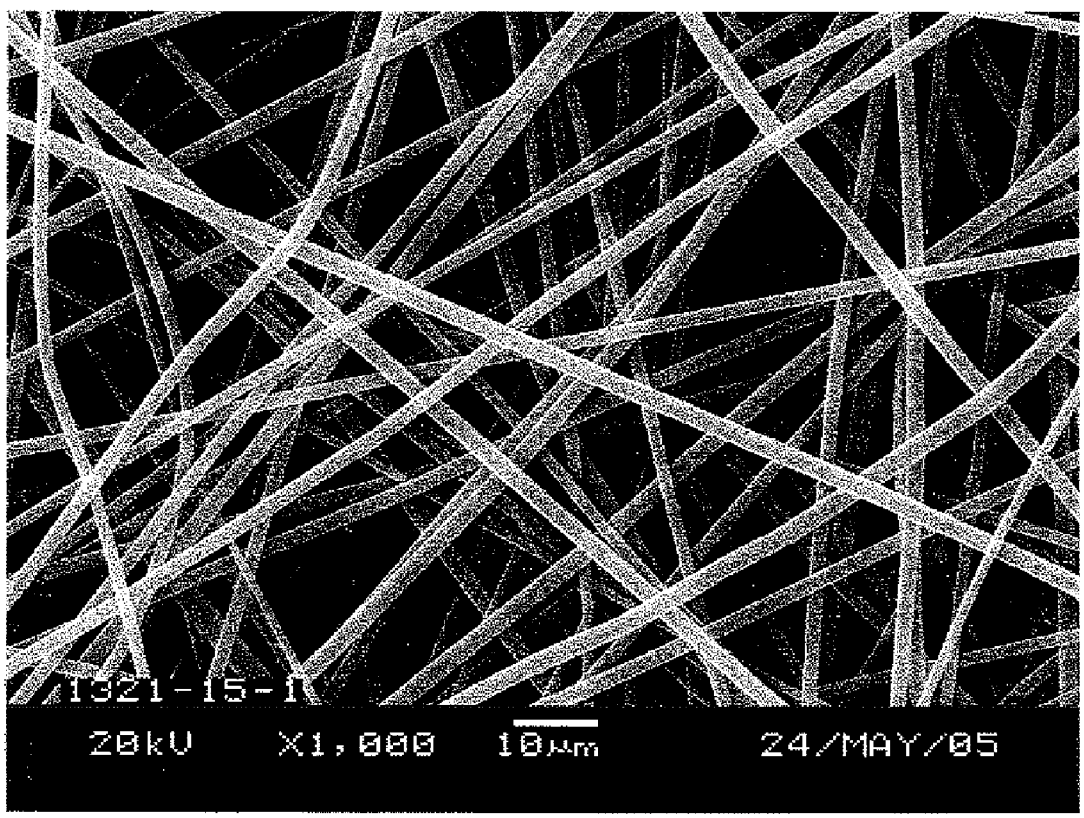

Electrospinning conditions: Solution electrospun onto aluminum substrate via a syringe, which flow is controlled through a syringe pump at 0.1 ml/min. The distance between the tip (needle) of the syringe and the aluminum substrate at 6 inches. Applied voltage of 17 Kvolts. FIGS. 4 and 5 are SEM photo micrographs of the fiber of Example 3.

Differential Scanning Calorimetry Analysis

Figure 1:
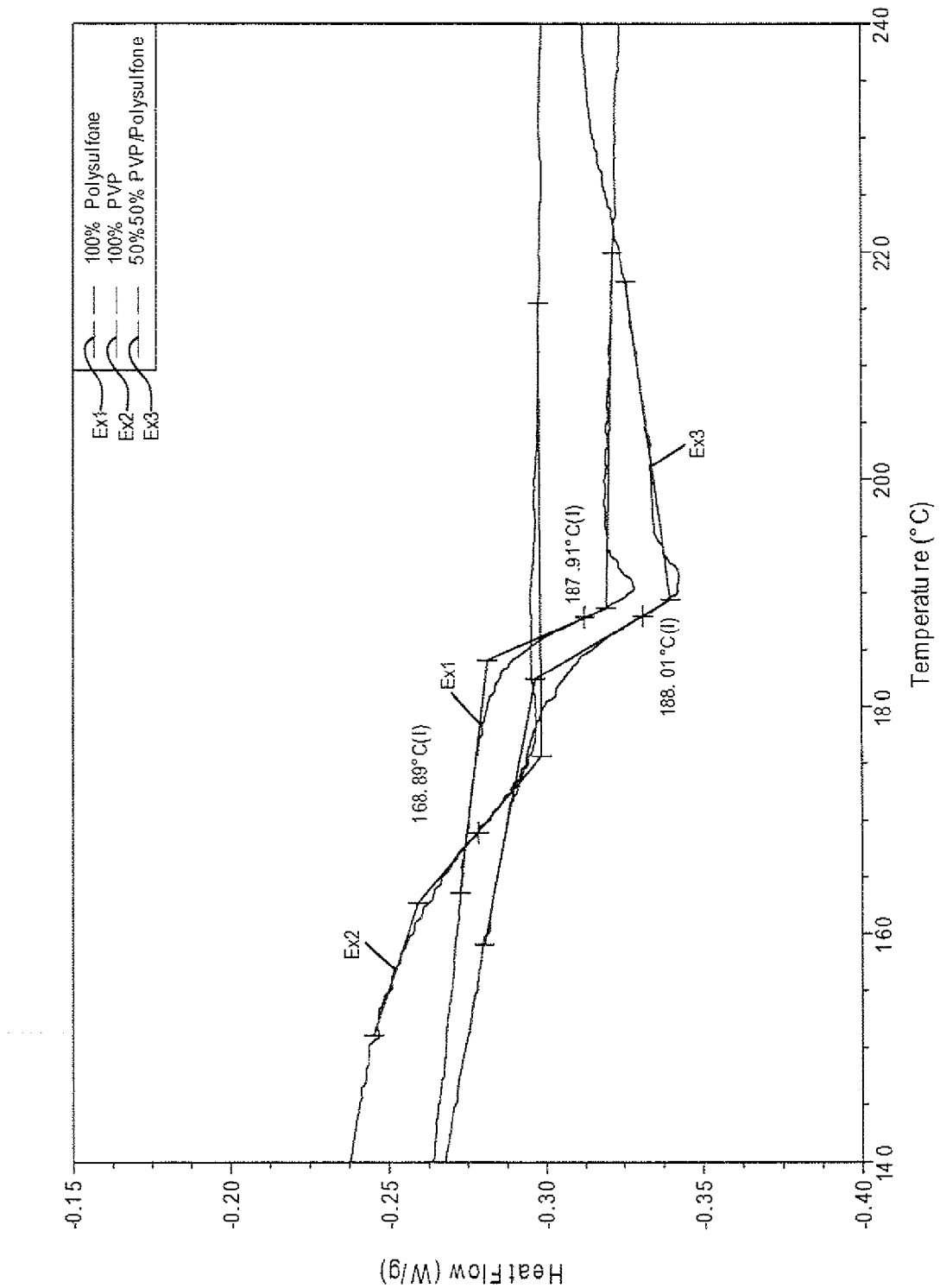
FIGS. 1-3 are charts of differential scanning calorimetry studies of the individual polymer components of the alloy (polyvinyl pyrrolidone and polysulfone polymers) compared to the calorimetry of a alloy material.

The samples were analyzed using a TA Instruments Differential Scanning Calorimeter. (DSC). The samples were weighed and crimped in an aluminum pan and run for 3 cycles (second cycle shown) from 30° C. equilibration to 250° C. The samples were ramped at 10° C. per minute under a nitrogen atmosphere. FIG. 1 shows the DSC curves for the polysulfone/PVP alloy fibers (Example 3) and for fibers of individual polymer species (Examples 1 and 2).

Example 4

A polymer solution was obtained as in Example 1 by combining the polymers and solvent in a container with constant agitation until a uniform solution was obtained.

Solution composition: 20% solids, with a composition polysulfone 75%, UDEL 1700 (from Solvey), by weight and 25% PVP, Luvitec K30 (from BASF) in solutions of a solvent composition of 50% THF and 50% DMF by weight.

Figure 2:
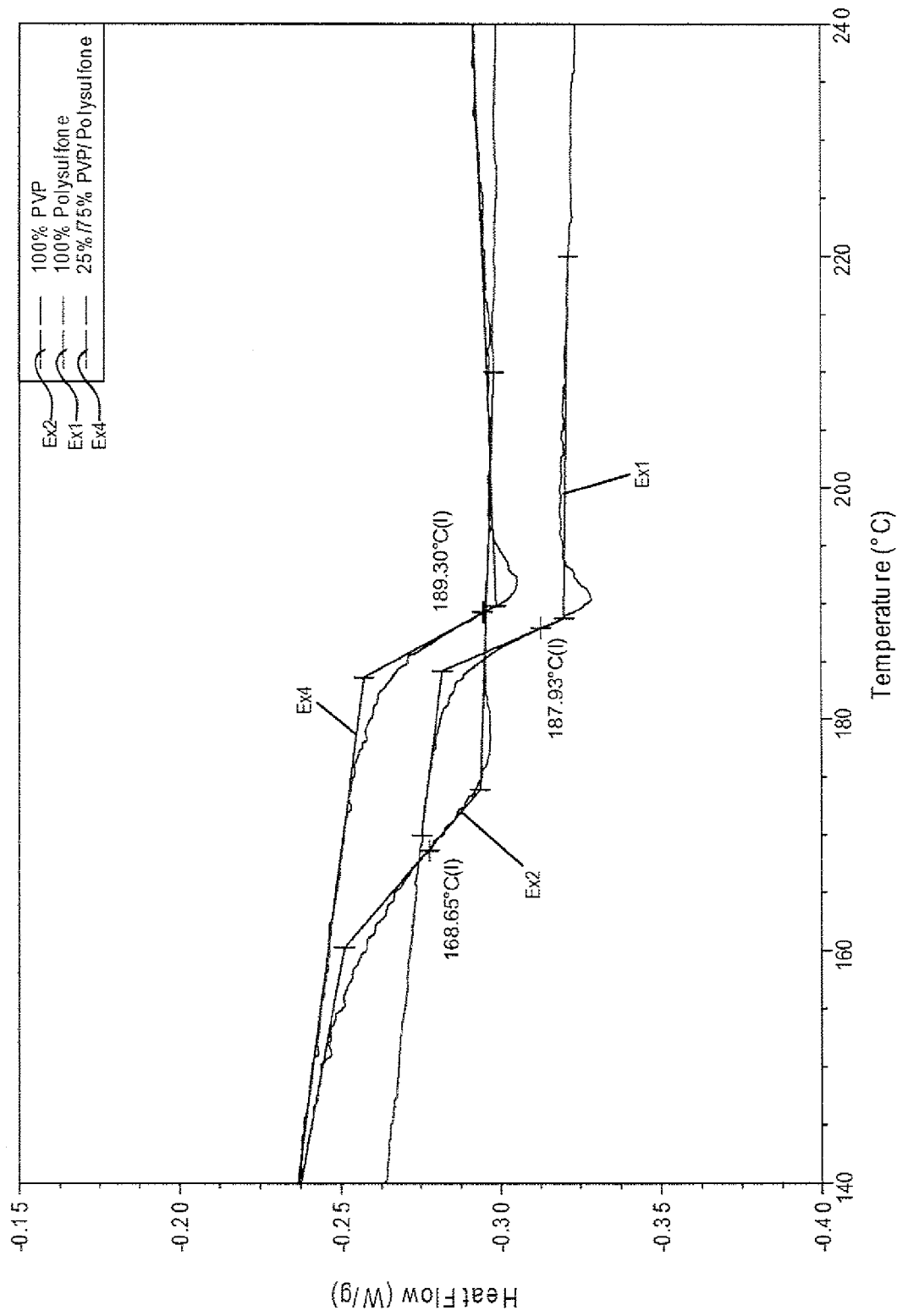
Figure 9:
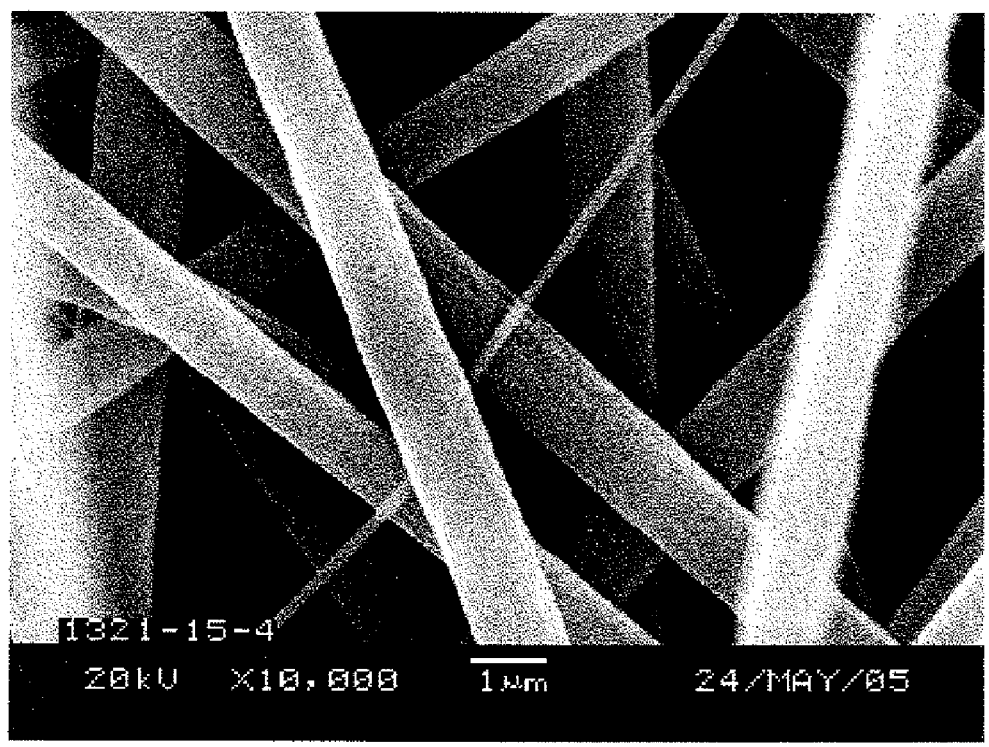

Electrospinning conditions: Solution electrospun onto aluminum substrate via a syringe, which flow is controlled through a syringe pump at 0.1 ml/min. The distance between the tip (needle) of the syringe and the aluminum substrate at 6 inches. Applied voltage of 20 Kvolts. Differential Scanning Calorimetry Analysis as in Example 1. FIG. 2 shows the DSC curves for the polysulfone/PVP alloy fibers (Example 4) and for fibers of individual polymer species (Examples 1 and 2). FIG. 9 is a SEM photo micrograph of the fiber of Example 4.

Example 5

A polymer solution was obtained as in Example 1 by combining the polymers and solvent in a container with constant agitation until a uniform solution was obtained. Solution composition: 20% solids, with a composition of 25% polysulfone, UDEL 1700 (from Solvey), and 75% PVP, Luvitec K30 (from BASF) by weight, in solutions of a solvent composition of 50% THF and 50% DMF by weight.

Figure 3:
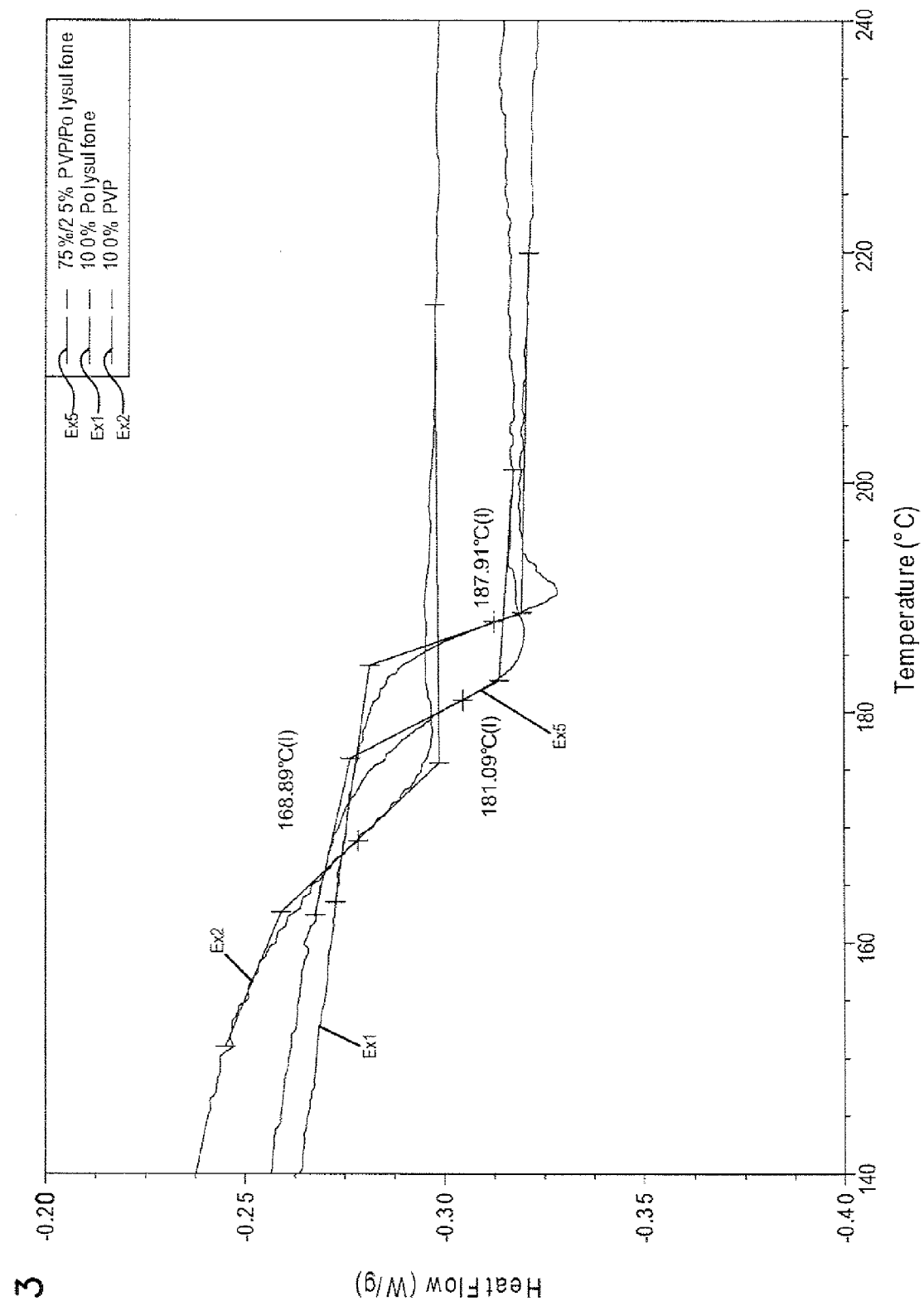
Figure 17:
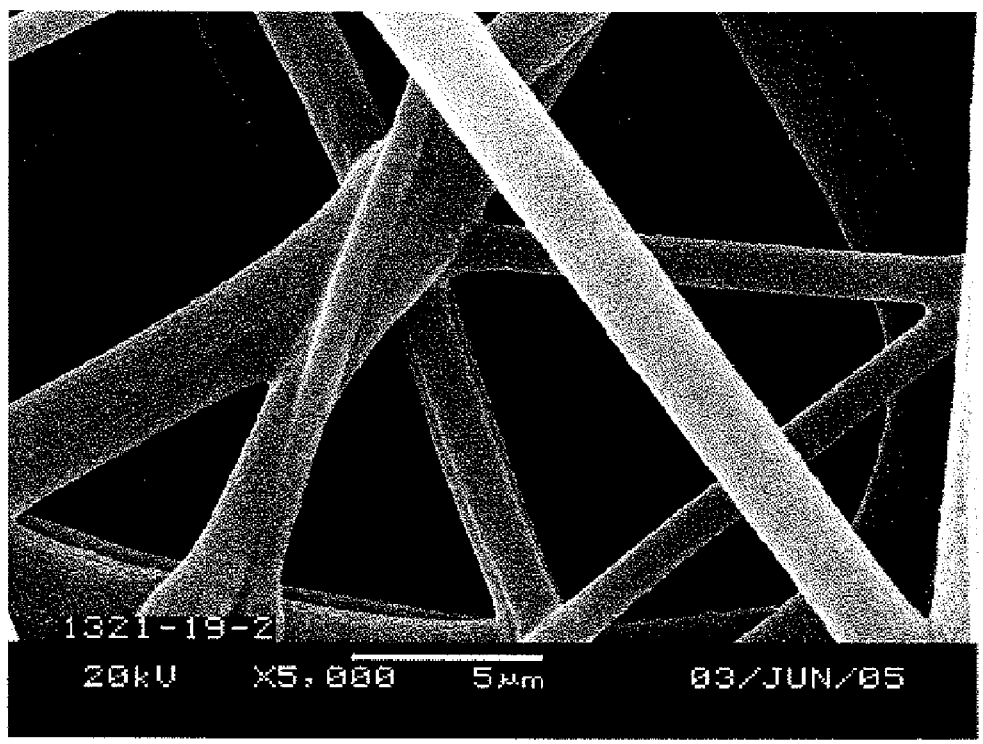

Electrospinning conditions: Solution electrospun onto aluminum substrate via a syringe, which flow is controlled through a syringe pump at 0.1 ml/min. The distance between the tip (needle) of the syringe and the aluminum substrate at 6 inches. Applied voltage of 18 Kvolts. Differential Scanning Calorimetry Analysis as in Example 1. FIG. 3 shows the DSC curves for the polysulfone/PVP alloy fibers (Example 5) and for fibers of individual polymer species (Examples 1 and 2). FIG. 17 is a SEM photo micrograph of the fiber of Example 5.

Example 6

A polymer solution was obtained as in Example 1 by combining the polymers and solvent in a container with constant agitation until a uniform solution was obtained. Solution composition: 15% solids, with a composition of polysulfone 50%, UDEL 1700 (from Solvey), by weight and 50% PVP, Luvitec K30 30 (from BASF), in solutions of a solvent composition of 50% THF and 50% DMF by weight. LiCl was added to the solution to result in a 0.04% overall salt concentration.

Figure 13:
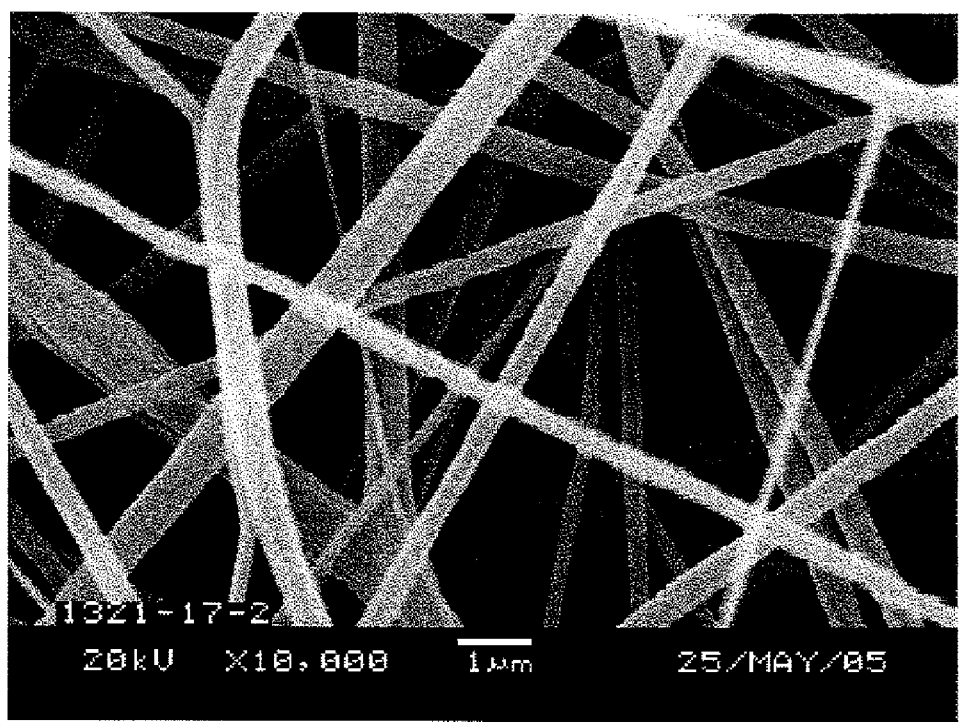

Electrospinning conditions: Solution electrospun onto aluminum substrate via a syringe, which flow is controlled through a syringe pump at 0.05 ml/min. The distance between the tip (needle) of the syringe and the aluminum substrate at 6 inches. Applied voltage of 15 Kvolts. FIG. 13 is a SEM photo micrograph of the fiber of Example 6.

Example 7

A polymer solution was obtained as in Example 1 by combining the polymers and solvent in a container with constant agitation until a uniform solution was obtained. Solution composition: 22% solids, with a composition polysulfone, UDEL 1700 (from Solvey), 90% by weight and 10% PVP, Luvitech K30 (from BASF) in a solution of a solvent composition of 40% THF and 60% DMF by weight.

Electrospinning conditions: Solution electrospun onto aluminum substrate via a syringe, which flow is controlled through a syringe pump at 0.1 ml/min. The distance between the tip (needle) of the syringe and the aluminum substrate at 6 inches. Applied voltage of 15 Kvolts.

Example 8

Using the solution and electrospinning conditions of Example 3, filter composite structures were fabricated by electrospinning onto a standard polyester non-woven media, rotating on a metal drum. The resulting fiber mat had an average fiber diameter of 1.2 µm, with an overall thickness of 8 µm, and an estimated deposited amount of 3.5 g/m$^2$.

Example 9

Using the following conditions, filter composite structures were fabricated by electrospinning onto a standard polyester non-woven media, rotating on a metal drum. Solution composition: 17.5% solids, with a composition polysulfone 50%, UDEL 1700 (from Solvey), by weight and 50% PVP, Luvitec K30 (from BASF), in solutions of a solvent composition of 50% THF and 50% DMF by weight. LiCl was added to the solution to result in a 0.04% overall salt concentration.

Electrospinning conditions: Solution electrospun onto aluminum substrate via a syringe, which flow is controlled through a syringe pump at 0.05 ml/min. The distance between the tip (needle) of the syringe and the aluminum substrate at 6 inches. Applied voltage of 15 Kvolts. 35% relative humidity. The resulting fiber mat had an average fiber diameter of 0.4 µm, with an overall thickness of 4 µm, and an estimated deposited amount of 1.5 g/m$^2$.

Example 10

Same conditions as Example 9, with longer fiber deposition time to result in a nanofiber mat thicker nanofiber mat. The resulting fiber mat had an average fiber diameter of 0.4 µm, with an overall thickness of 8 µm, and an estimated deposited amount of 3.5 g/m$^2$.

Figure 6:
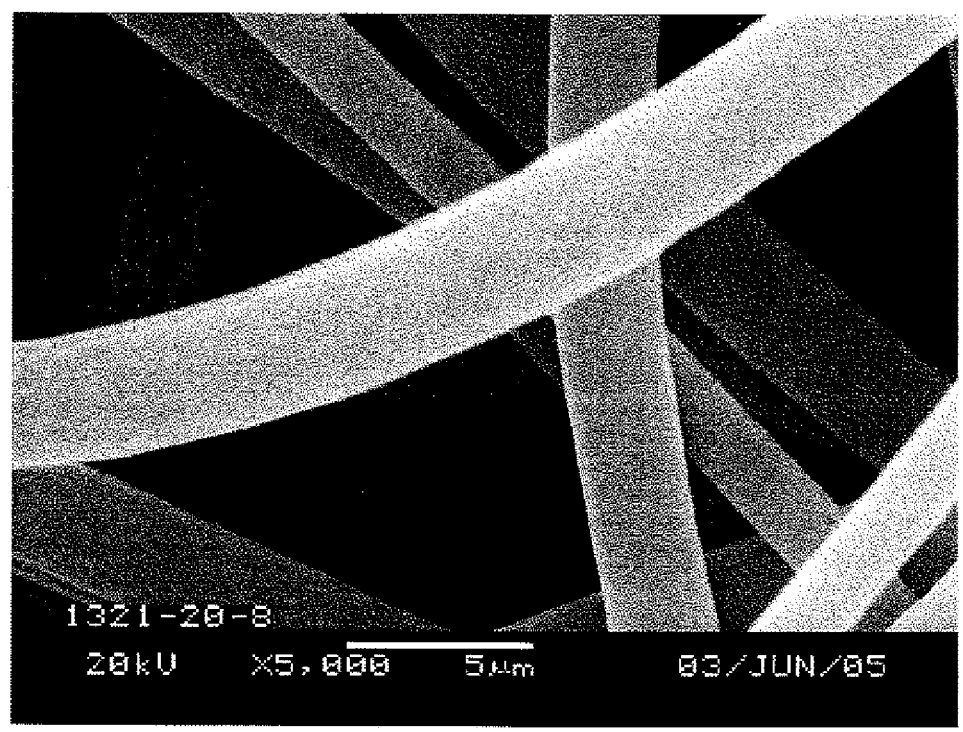

Water Resistance: In order to verify the resistance of the fibers to hot water environment, selected samples were immersed in boiling water for 24 hours. In addition to "as made samples", samples annealed at 200° C. for 10 minutes were also included. SEM micrographs were taken before and after each treatment in order to evaluate morphological changes that could have occurred. FIG. 6 shows a SEM photo micrograph of the fiber of Example 3 immersed in boiling water for 24 hours.

Figure 7:
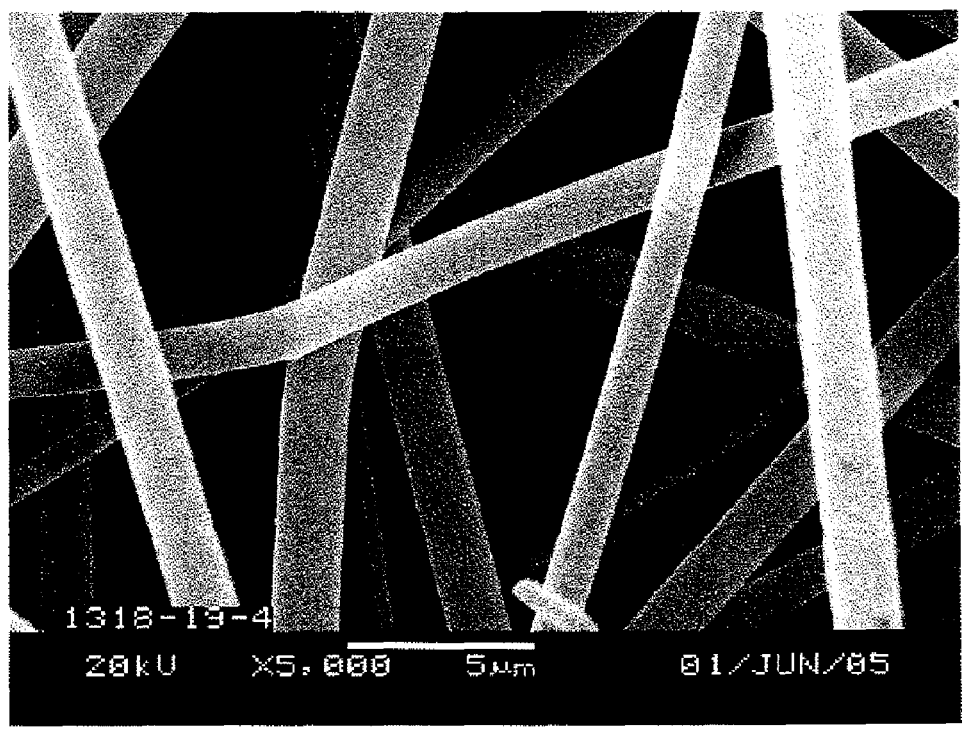
Figure 8:
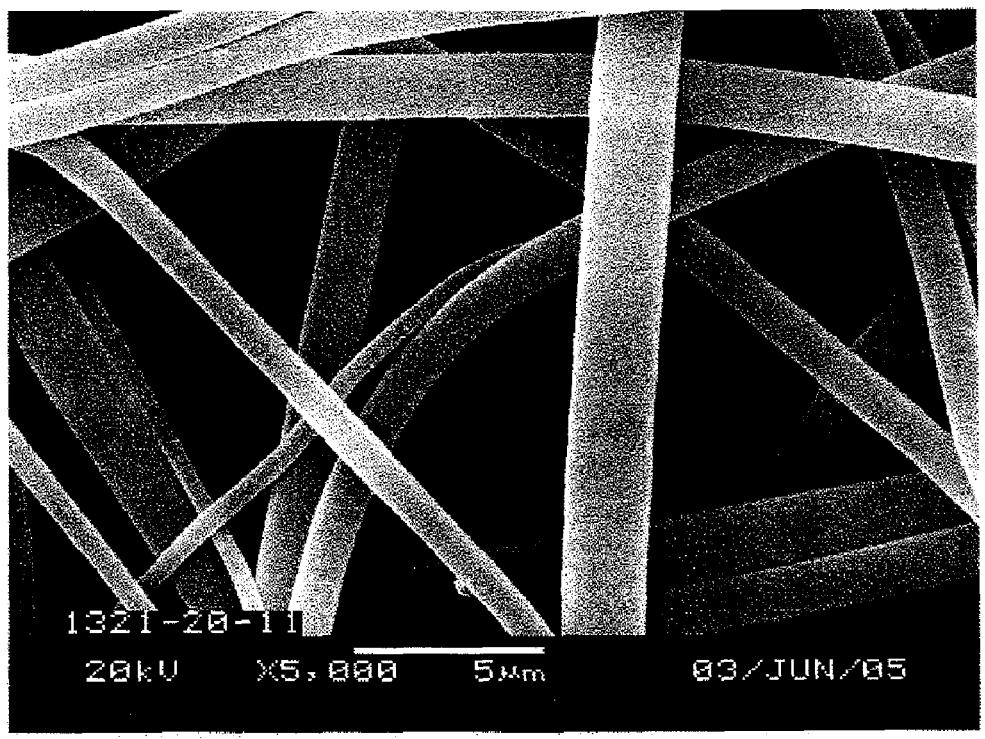

FIG. 7 shows a SEM photo micrograph of the fiber of Example 3 after annealing at 190° C. for 10 min. FIG. 8 shows a SEM photo micrograph of the fiber of Example 3 after annealing at 190° C. for 10 min. and after being immersed in boiling water for 24 hours.

Figure 10:
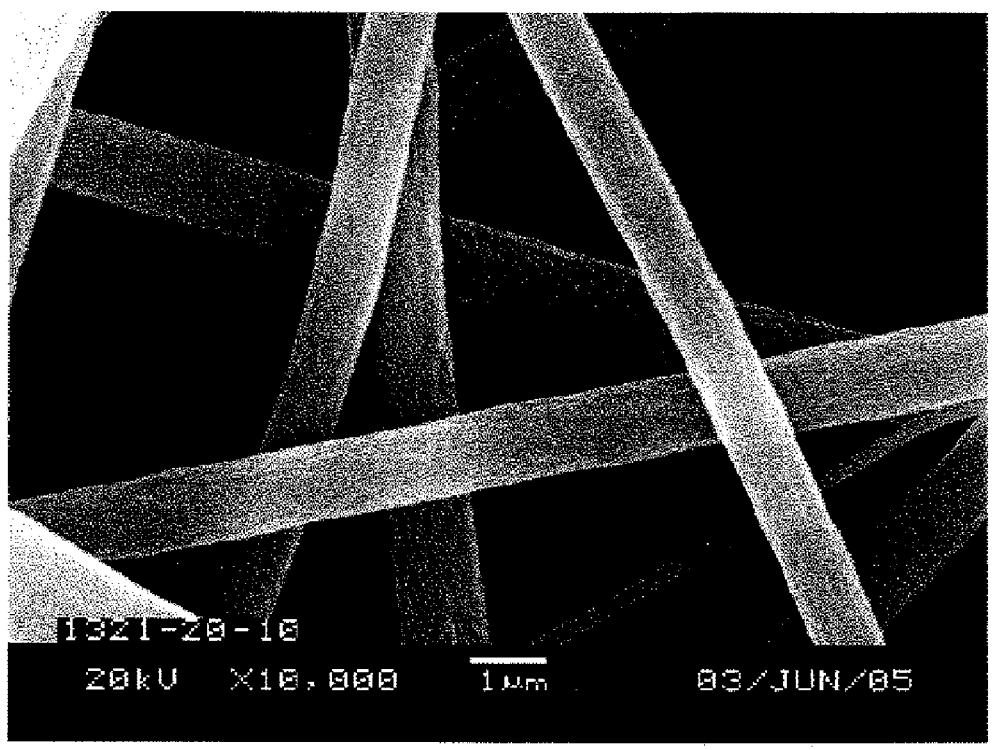
Figure 11:
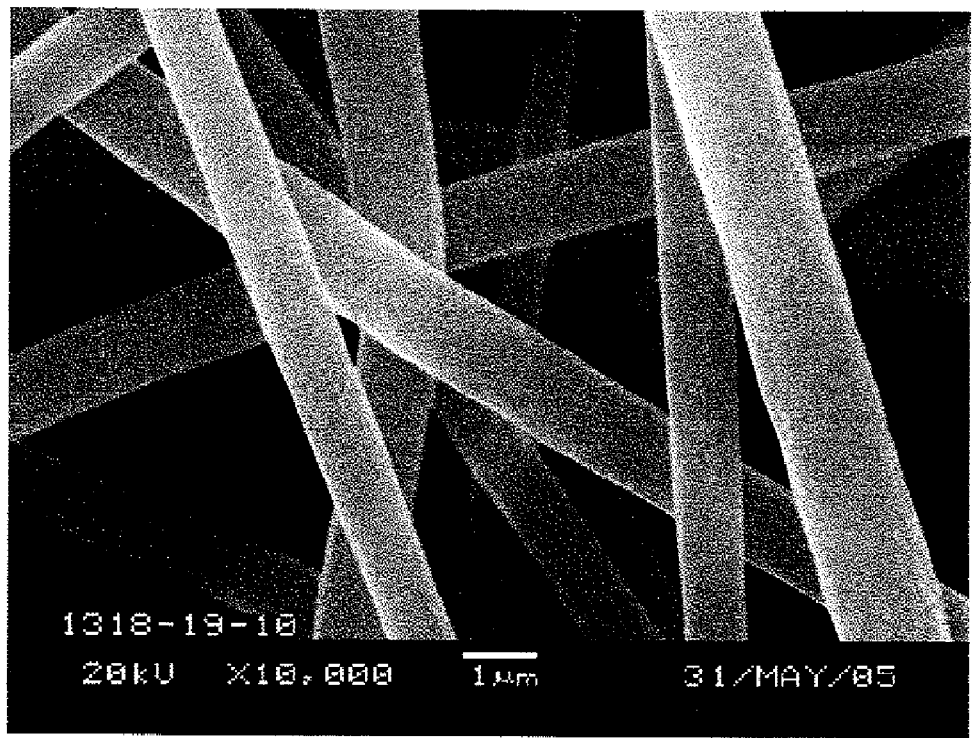
Figure 12:
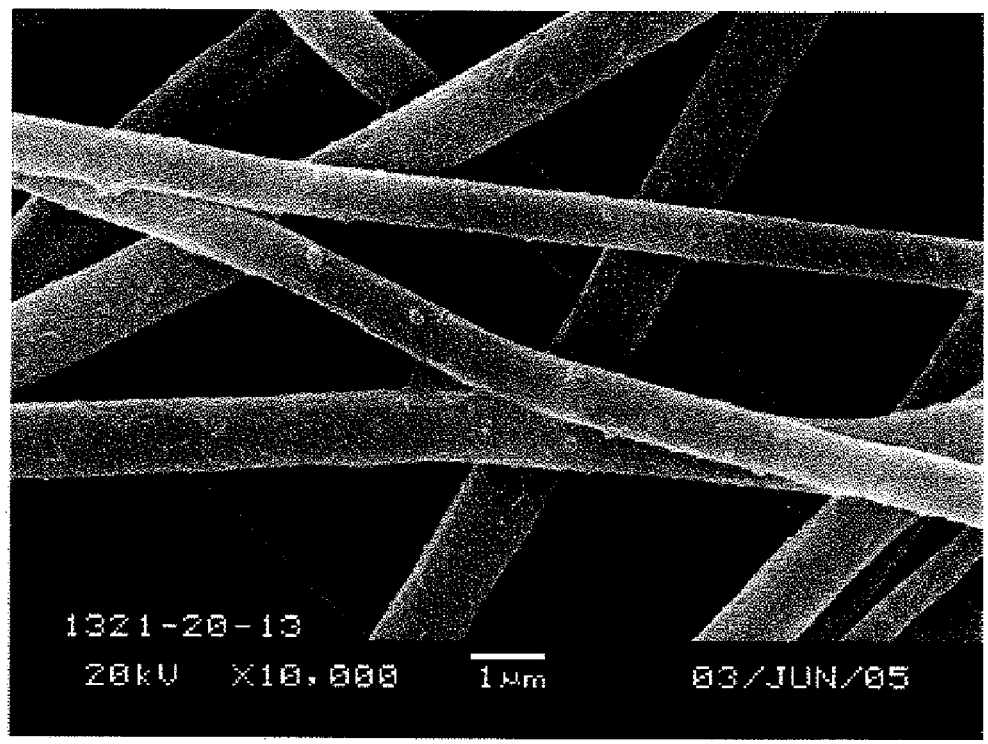

FIG. 10 shows a SEM photo micrograph of the fiber of Example 4 immersed in boiling water for 24 hours. FIG. 11 shows a SEM photo micrograph of the fiber of Example 4 after annealing at 190° C. for 10 min. FIG. 12 shows a SEM photo micrograph of the fiber of Example 4 after annealing at 190° C. for 10 min. and after being immersed in boiling water for 24 hours.

Figure 14:
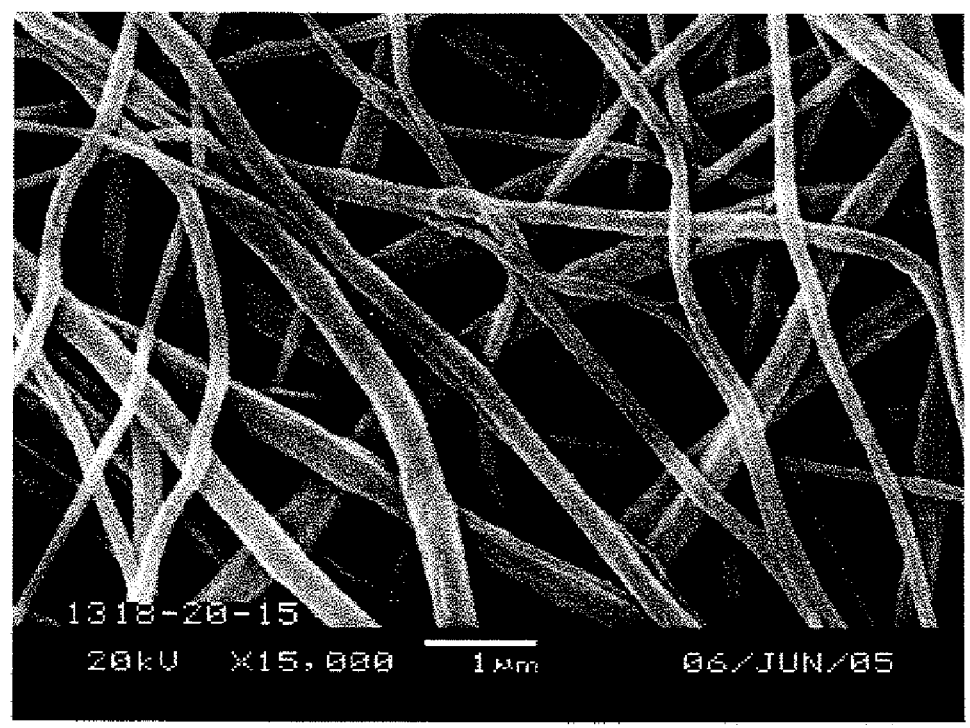
Figure 15:
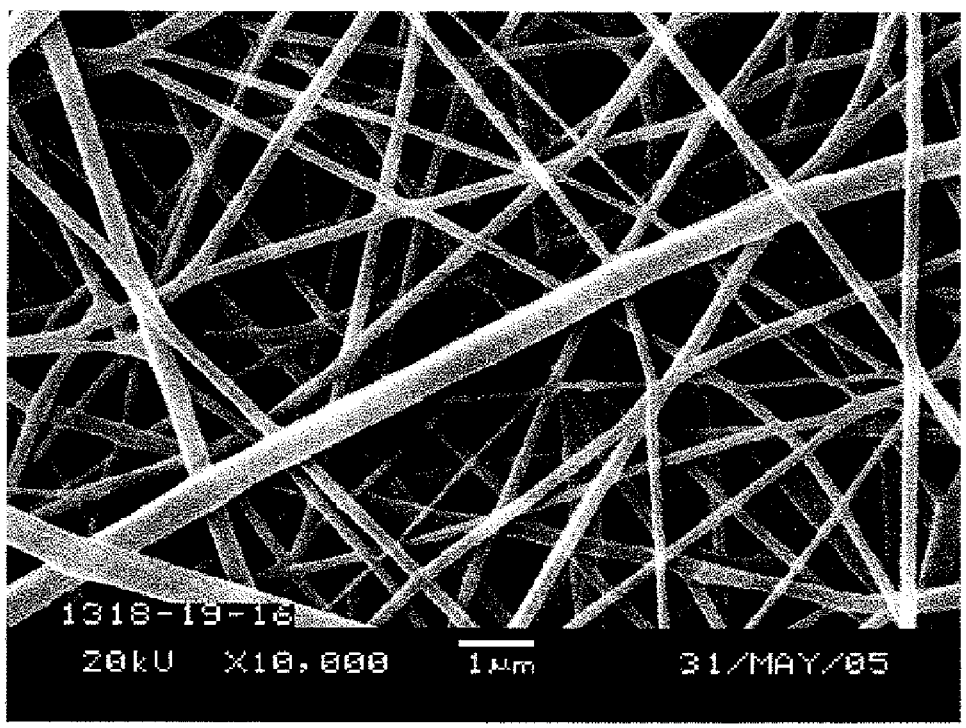
Figure 16:
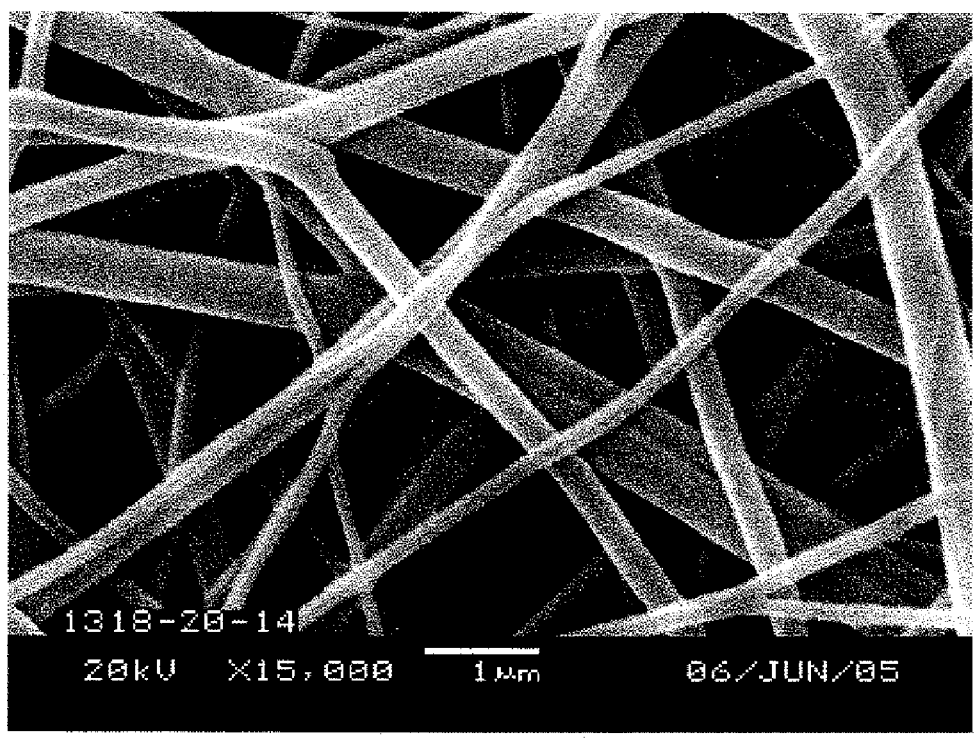
Figure 18:
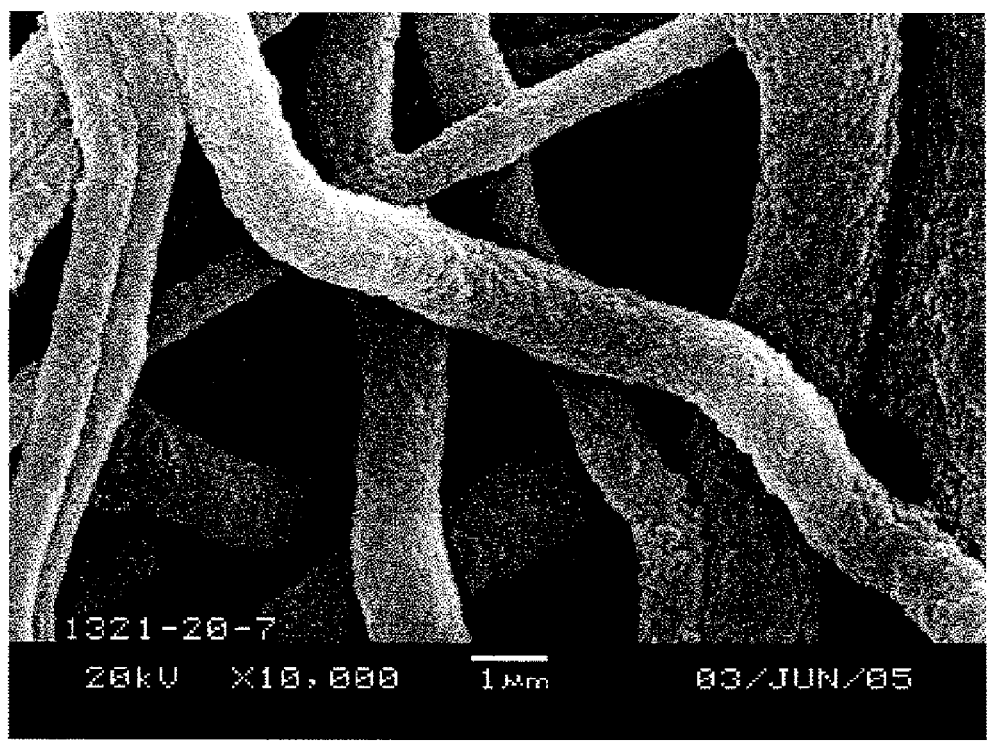
Figure 19:
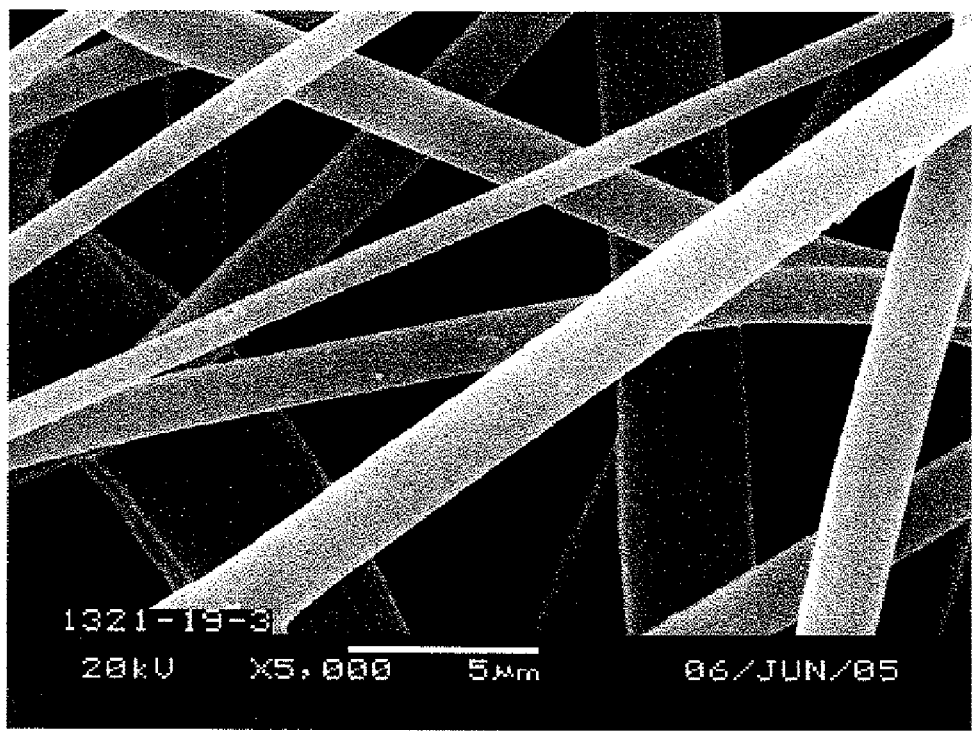
Figure 20:
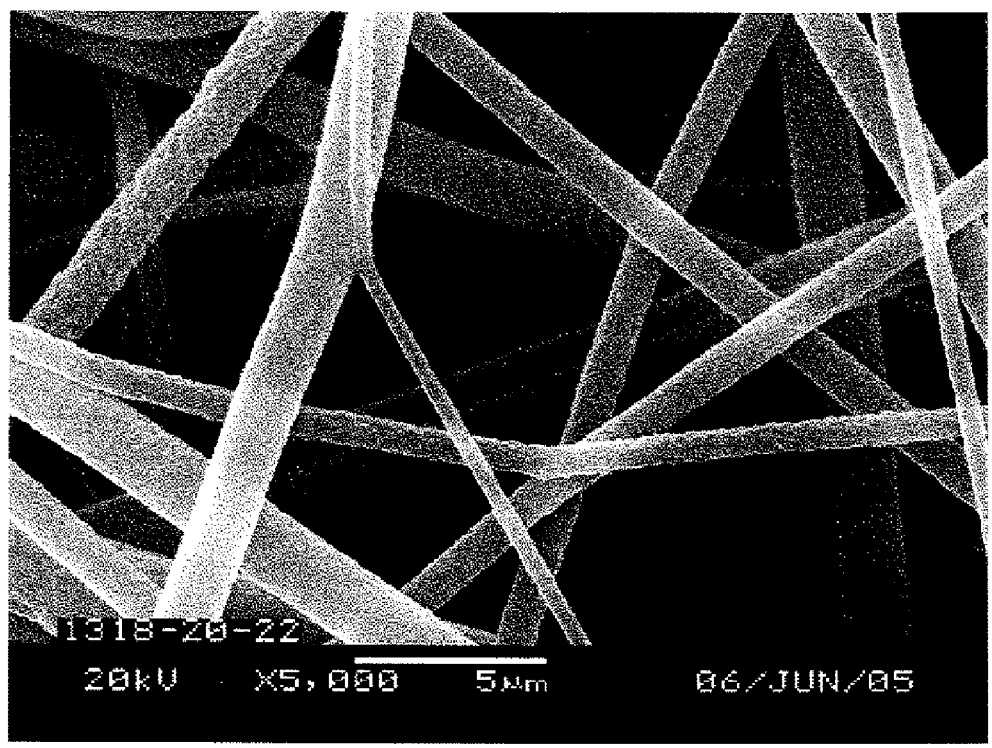

FIG. 14 shows a SEM photo micrograph of the fiber of Example 6 immersed in boiling water for 24 hours. FIG. 15 shows a SEM photo micrograph of the fiber of Example 6 after annealing at 190° C. for 10 min. FIG. 16 shows a SEM photo micrograph of the fiber of Example 6 after annealing at 190° C. for 10 min. and after being immersed in boiling water for 24 hours. FIG. 18 shows a SEM photo micrograph of the fiber of Example 5 immersed in boiling water for 24 hours. FIG. 19 shows a SEM photo micrograph of the fiber of Example 5 after annealing at 190° C. for 10 min. FIG. 20 shows a SEM photo micrograph of the fiber of Example 5 after annealing at 190° C. for 10 min. and after being immersed in boiling water for 24 hours.

Hydrophilicity/Hydrophobicity. Water dynamic contact angle measurements were employed in order to assess the relative hydrophilicity of the fiber matrices. Initial contact angle values, as well as values after the first few seconds can serve as qualitative measure of the matrices hydrophilicity and related wicking properties. The measurements were performed using the FTA 200 goniometer from First Ten Angstrom substantially as described in the operations manual. For dynamic contact angle measurements, liquids were loaded into an application device and applied as designed. Computer software controlled the dispensing rate and the contact angle was obtained for analysis using software provided with the goniometer. Images were taken as designated in the operations manual.

FIG. 21 shows the Dynamic water contact angle for Examples 1, 4, 5 and 7 unannealed and annealed. The use of the alloy of the invention obtained a low contact angle that establishes a substantial hydrophilic nature.

Air Filtration Performance LEFS Efficiency: A 4 inch diameter sample was cut from the media. Particle capture efficiency of the test specimen is calculated using 0.8 μm latex spheres as a test challenge contaminant in the LEFS bench operating at 20 FPM.

Air Flow: Measurements of air flow were performed on a TEXTEST FX 3300 instrument operating at 125 Pa.

| Sample | Efficiency (%) | Pressure drop (mm H$_2$O) | Air Flow (ft$^3$-min$^{-1}$ at 125 Pa) |
|---|---|---|---|
| Substrate Remay 2214 | 5 | 0.02 | 500 |
| Example 8 | 45 | 0.03 | 235 |
| Example 9 | 75 | 0.11 | 125 |
| Example 10 | 77 | 0.13 | 85 |

Example 11

| | Pore Sizes, Water Flow | | |
|---|---|---|---|
| | Nanofiber layer Thickness | Water flow (ml-sec$^{-1}$, 0.6 cm dia. @ 3 Kpa) | Mean flow pore diameter (μm) |
| Substrate | N/A | 16.5 | 35 |
| Example 8 | 8 μm | 4.5 | 10 |
| Example 9 | 4 μm | 3.5 | 3.0 |
| Example 10 | 8 μm | 3.1 | 2.5 |

Pore diameter and water flow were measured using the standard procedure for a capillary flow porometer, PMI APP 1200 AEXSC.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of filtering a gaseous stream, the method comprising the steps of: (a) flowing a gaseous stream through a filter medium, the medium comprising fine fiber, the fine fiber comprising a thermoplastic polymer alloy comprising: (i) an N-vinyl lactam polymer; and (ii) a polysulfone polymer; and (b) removing a particulate entrained in the stream; wherein the alloy displays a single glass transition temperature ($T_g$), wherein said $T_g$ is found at a temperature that ranges from about 180 to about 190° C., wherein the fine fiber has a fiber diameter that ranges from about 0.01 to about 5 microns and the layer comprise a thickness of about 5 to 50 microns and a basis weight of up to about 200 g/m$^2$.

2. The filter method of claim 1 wherein the medium comprises a support comprising a non-woven fabric and a fine fiber layer comprising a fiber diameter that ranges from about 0.05 to about 2 microns and the layer comprise a thickness of about 10 to 30 microns and a basis weight of up to about 0.50 to 150 g/m$^2$.

3. The filter method of claim 1 wherein the fiber comprises greater than about 25 wt % of the N-vinyl lactam polymer.

4. The filter method of claim 1 wherein the N-vinyl lactam polymer is a vinyl pyrrolidone polymer.

5. The filter method of claim 3 wherein the polysulfone is a bisphenol-A polysulfone.

6. The filter method of claim 1 wherein the polysulfone is a polysulfone copolymer.

7. The filter method of claim 1 wherein the fiber comprises about 25 to 75 wt % of a polyvinyl pyrrolidone and about 25 to 75 wt % of the bisphenol-A-polysulfone.

8. The filter method of claim 1 wherein the fiber comprises about 0.001 to 5 wt % of an inorganic salt.

9. The filter method of claim 1 wherein the inorganic salt comprises an alkali metal halide.

10. The filter method of claim 1 wherein fine fiber layer comprising a fiber diameter that ranges from about 0.05 to about 0.5 microns and the layer comprise a thickness of about 10 to 20 microns and a basis weight of up to about 1 to 100 g/m$^2$.

11. The filter method of claim 1 wherein the stream comprises an atmospheric gaseous stream.

12. The filter method of claim 1 wherein the stream comprises a waste gas.

\* \* \* \* \*